United States Patent
Yu et al.

(10) Patent No.: US 10,177,982 B2
(45) Date of Patent: Jan. 8, 2019

(54) METHOD FOR UPGRADING VIRTUALIZED NETWORK FUNCTION AND NETWORK FUNCTION VIRTUALIZATION ORCHESTRATOR

(71) Applicant: HUAWEI TECHNOLOGIES CO., LTD., Shenzhen (CN)

(72) Inventors: Fang Yu, Beijing (CN); Chunshan Xiong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 342 days.

(21) Appl. No.: 15/222,270

(22) Filed: Jul. 28, 2016

(65) Prior Publication Data

US 2016/0337172 A1 Nov. 17, 2016

Related U.S. Application Data

(63) Continuation of application No. PCT/CN2014/071806, filed on Jan. 29, 2014.

(51) Int. Cl.
*G06F 15/167* (2006.01)
*H04L 12/24* (2006.01)
(Continued)

(52) U.S. Cl.
CPC ........ *H04L 41/082* (2013.01); *H04L 12/4641* (2013.01); *H04L 12/6418* (2013.01); *H04L 67/34* (2013.01)

(58) Field of Classification Search
None
See application file for complete search history.

(56) References Cited

U.S. PATENT DOCUMENTS 8,429,639 B2 4/2013 Jirka
2001/0037397 A1 11/2001 Boucher et al.
(Continued)

FOREIGN PATENT DOCUMENTS

CN 1659539 A 8/2005

OTHER PUBLICATIONS

ETSI (European Technical Specification Institute) Network Function Virtualization (NFV) Management and Orchestration, Jan. 2014, Version V0.2.1, Chapter 6.3. (Year: 2014).*
(Continued)

*Primary Examiner* — Chris Parry
*Assistant Examiner* — Stephen J Houlihan
(74) *Attorney, Agent, or Firm* — Staas & Halsey LLP

(57) ABSTRACT

The present application provides a method for upgrading a virtualized network function and a network function virtualization orchestrator NFVO. The NFVO includes: a receiver, configured to receive an upgrade request message, the upgrade request message is configured to request the NFVO to upgrade a first software version corresponding to a first VNF to a second software version, the first software version corresponds to a first VNF instance, and the second software version corresponds to a second VNF instance; and a processor, configured to: instantiate the first VNF to obtain the second VNF instance; configure forwarding paths of service flows in an NS, so that a first service flow is forwarded to the first VNF instance and that a second service flow is forwarded to the second VNF instance; and terminate the first VNF instance if it is determined that the first VNF instance runs without loads within a preset time.

18 Claims, 6 Drawing Sheets

(51) Int. Cl.
  *H04L 12/64* (2006.01)
  *H04L 12/46* (2006.01)
  *H04L 29/08* (2006.01)

(56) References Cited

U.S. PATENT DOCUMENTS

2002/0055989 A1  5/2002  Stringer-Calvert et al.
2003/0200295 A1  10/2003  Roberts et al.
2010/0290348 A1  11/2010  Stanislaus et al.
2012/0005276 A1  1/2012  Guo et al.

OTHER PUBLICATIONS

International Search Report dated Oct. 29, 2014 in corresponding International Application No. PCT/CN2014/071806.
Extended European Search Report dated Oct. 13, 2016 in corresponding European Patent Application No. 14880848.8.
International Search Report and Written Opinion dated Oct. 29, 2014 in corresponding International Patent Application No. PCT/CN2014/071806.
"Update-Upgrade-Migration Terms", NFVSWA(13)35_001, NSN, Nov. 13, 2013, pp. 1-3.
Deepanshu Gautam et al., "VNF Migration/Update/Upgrade Concepts", Nov. 13, 2013, pp. 1-6.
"Network Function Virtualization (VNF) Management and Orchestration", GS NFV-MAN 001 V0.2.1, Network Functions Virtualization (NFV) ETSI Industry Specification Group (ISG), Jan. 22, 2014, pp. 1-105.
"3$^{rd}$ Generation Partnership Project; Technical Specification Group Core Network and Terminals; Open Service Access (OSA); Application Programming Interface (API); Part 1: Overview (Release 9)", 3GPP TS 29.198-1 V9.0.0, 3$^{rd}$ Generation Partnership Project, Dec. 2009, Valbonne, France, pp. 1-55.
Chinese Office Action dated May 2, 2018 in corresponding Chinese Patent Application No. 201480001637.0.

\* cited by examiner

METHOD FOR UPGRADING VIRTUALIZED NETWORK FUNCTION AND NETWORK FUNCTION VIRTUALIZATION ORCHESTRATOR

CROSS-REFERENCE TO RELATED APPLICATIONS

This application is a continuation of International Application No. PCT/CN2014/071806, filed on Jan. 29, 2014, which is hereby incorporated by reference in its entirety.

TECHNICAL FIELD

The present application relates to the field of communications technologies, and in particular, to a method for upgrading a virtualized network function and a network function virtualization orchestrator.

BACKGROUND

Currently, the European Telecommunications Standards Institute (European Telecommunications Standards Institute, ETSI for short) has established a Network Function Virtualization Industry Specification Group (Network Function Virtualization Industry Specification Group, NFV ISG for short) for the purpose of using a virtualization technology of an Internet technology (Internet Technology, IT for short), so that universal hardware can implement some network functions. This requires that a network function should run on universal hardware in a form of a virtualized network function (Virtualized Network Function, VNF for short), and the VNF herein is a virtualized entity having a network function. For example, if a VNF has a mobility management entity (Mobility Management Entity, MME for short) function, this VNF is a virtual MME. In addition, the VNF is deployed on one or more virtual machines (Virtual Machine, VM for short), so that the VNF runs and becomes a VNF instance, which is known as an instantiation process of the VNF.

Currently, in a network function virtualization management and orchestration (Network Function Virtualization Management and Orchestration, NFV MANO for short) architecture discussed in standards, referring to FIG. 1, the architecture may include an operation support system (Operation Support System, OSS for short) or a business support system (Business Support System, BSS for short), a VNF, a network function virtualization infrastructure (NFV Infrastructure, NFVI for short), a virtualized infrastructure manager (Virtualized Infrastructure Manager, VIM for short), an NFV orchestrator (NFV Orchestrator, NFVO for short), and a VNF manager (VNF Manager, VNFM for short). The VNF corresponds to a virtualized physical network function (Physical Network Function, PNF for short). For example, the VNF may be a virtual core network, such as EPC (Evolved Packet Core, EPC for short) node, that is, it may be a virtual MME or a virtual service gateway (Service Gateway, S-GW for short). The NFVI includes hardware resources, virtual resources, and a virtual layer. The VIM is configured to control and manage a virtualized entity. The NFVO is responsible for orchestrating and managing NFVI resources on a network side, and implementing an NFV service topology in the NFVI. The VNFM is responsible for managing a lifecycle of a VNF instance. In addition, the NFV MANO further includes four repositories, namely, a network service catalog (Network Service Catalog, NS Catalog for short), a VNF catalog, an NFV instance repository (Instance), and an NFVI resource repository. A network service descriptor (NS Descriptor, NSD for short) for describing a network service (Network Service, NS for short) is stored in the NS Catalog, and actually the NS herein may be a virtual EPC, including at least one VNF forwarding graph (VNF Forwarding Graph, VNFFG for short), where one VNFFG includes at least one VNF and virtual links between these network functions. The VNFFG is mainly configured to describe a service flow between the network functions. A VNF descriptor (VNF Descriptor, VNFD for short) for describing a hardware resource requirement of software in the VNF is stored in the VNF catalog. An NS instance and a VNF instance are stored in the NFV instance repository. An NFVI resource status is stored in the NFVI resource repository.

In the prior art, when a new function is introduced into the VNF, a software version in the VNF needs to be upgraded. In an upgrade process, a sender (Sender) sends an upgrade request of the VNF to the NFVO, and the NFVO sends the upgrade request to the VNFM, so that the VNFM instructs a VM corresponding to the VNF to prepare for upgrade and data migration; after obtaining a response message from the VM, the VNFM initiates a VNF instantiation process to obtain a new VNF instance (software in the VNF instance is of an upgraded software version), installs to-be-migrated data in the upgraded new VNF instance, and performs subsequent processing; and finally, the VNFM performs a switching process, that is, the upgraded VNF instance is powered on and goes online, and a VNF instance of an old version is powered off and goes offline.

However, the VNF upgrade process in the prior art may interrupt running of the VNF instance of the old version and therefore affect a service in the VNF instance of the old version. In particular, some services that have higher real-time requirements are greatly affected.

SUMMARY

Embodiments of the present application provide a method for upgrading a virtualized network function and a network function virtualization orchestrator to solve a technical problem that a VNF upgrade process in the prior art interrupts running of a VNF instance of an old version and affects a service in the VNF instance of the old version.

According to a first aspect, an embodiment of the present application provides a network function virtualization orchestrator, including:

a receiver, configured to receive an upgrade request message sent by a sender, where the upgrade request message is configured to request the network function virtualization orchestrator NFVO to upgrade a first software version corresponding to a first virtualized network function VNF to a second software version, the first software version corresponds to a first VNF instance, and the second software version corresponds to a second VNF instance; and a processor, configured to: instantiate the first VNF according to a preset VNFD of the second software version of the first VNF in a VNF catalog to obtain the second VNF instance; after connecting the second VNF instance to a network service NS in which the first VNF instance is located, configure forwarding paths of service flows in the NS, so that a first service flow is forwarded to the first VNF instance for processing and that a second service flow is forwarded to the second VNF instance for processing; and terminate, by the NFVO, the first VNF instance if it is determined that the first VNF instance runs without loads within a preset time.

With reference to the first aspect, in a first possible implementation manner of the first aspect, the processor is specifically configured to determine at least one first NS to which the first VNF instance belongs, and send an identifier of the first NS to the sender, where the first NS includes at least one virtualized network function forwarding graph VNFFG, a first VNFFG of the at least one VNFFG includes the first VNF instance, and the first NS corresponds to a first network service descriptor NSD; acquire a preset second NSD in an NS catalog according to an identifier of a second NS in an NS instance update request that is sent by the sender and received by the receiver, and determine, according to the second NSD, to instantiate the first VNF, where the second NS is the to-be-updated first NS determined by the sender according to the identifier of the first NS, and the second NSD is a modified first NSD; and instantiate the first VNF according to the preset VNFD of the second software version of the first VNF in the VNF catalog to obtain the second VNF instance; and the receiver is further configured to receive the NS instance update request sent by the sender, where the NS instance update request includes an identifier of at least one second NS.

With reference to the first possible implementation manner of the first aspect, in a second possible implementation manner of the first aspect, the processor is specifically configured to connect the second VNF instance to the second NS, and obtain an updated second NS, where the updated second NS includes the first VNFFG and a second VNFFG, the second VNFFG includes the second VNF instance, and a manner in which the second VNF instance in the second VNFFG is connected to other VNF instances in the second VNFFG is the same as a manner in which the first VNF instance in the first VNFFG is connected to other VNF instances in the first VNFFG With reference to the second possible implementation manner of the first aspect, in a third possible implementation manner of the first aspect, the processor is specifically configured to configure the first VNFFG and the second VNFFG for the service flows as the forwarding paths of the service flows, so that the first service flow is forwarded to the first VNFFG for processing, and that the second service flow is forwarded to the second VNFFG for processing.

With reference to the second possible implementation manner of the first aspect, in a fourth possible implementation manner of the first aspect, the processor is specifically configured to instruct an NS service management entity to configure the first VNFFG and the second VNFFG for the service flows as the forwarding paths of the service flows, so that the first service flow is forwarded to the first VNFFG for processing, and that the second service flow is forwarded to the second VNFFG for processing.

With reference to the first aspect, in a fifth possible implementation manner of the first aspect, the processor is specifically configured to check whether the first VNF instance exists; if the first VNF instance exists, acquire the preset VNFD of the second software version of the first VNF in the VNF catalog; and instantiate the first VNF according to the VNFD of the second software version of the first VNF to obtain the second VNF instance.

With reference to the fifth possible implementation manner of the first aspect, in a sixth possible implementation manner of the first aspect, the processor is specifically configured to connect the second VNF instance to the NS in which the first VNF instance is located, where a manner in which the second VNF instance is connected to other VNF instances in the NS is the same as a manner in which the first VNF instance is connected to other VNF instances in the NS.

With reference to the sixth possible implementation manner of the first aspect, in a seventh possible implementation manner of the first aspect, the processor is specifically configured to configure the first VNF instance and the second VNF instance for the service flows as nodes of the forwarding paths of the service flows in the NS, and generate a service flow forwarding table; and configure the service flow forwarding table for a third VNF instance, so that the third VNF instance forwards, according to the service flow forwarding table, the first service flow to the first VNF instance for processing and the second service flow to the second VNF instance for processing, where the third VNF instance is adjacent to the first VNF instance and the second VNF instance separately.

With reference to the sixth possible implementation manner of the first aspect, in an eighth possible implementation manner of the first aspect, the processor is specifically configured to configure a weight of a first virtual link between the first VNF instance and a third VNF instance and a weight of a second virtual link between the second VNF instance and the third VNF instance for the third VNF instance, so that the third VNF instance forwards, according to the weight of the first virtual link and the weight of the second virtual link, the first service flow to the first VNF instance for processing and the second service flow to the second VNF instance for processing, where the third VNF instance is adjacent to the first VNF instance and the second VNF instance separately.

With reference to the sixth possible implementation manner of the first aspect, in a ninth possible implementation manner of the first aspect, the processor is specifically configured to instruct an NS service management entity to: configure the first VNF instance and the second VNF instance for the service flows as nodes of the forwarding paths of the service flows in the NS and generate a service flow forwarding table; and instruct the NS service management entity to configure the service flow forwarding table for a third VNF instance, so that the third VNF instance forwards, according to the service flow forwarding table, the first service flow to the first VNF instance for processing and the second service flow to the second VNF instance for processing, where the third VNF instance is adjacent to the first VNF instance and the second VNF instance separately.

With reference to the sixth possible implementation manner of the first aspect, in a tenth possible implementation manner of the first aspect, the processor is specifically configured to instruct an NS service management entity to configure a weight of a first virtual link between the first VNF instance and a third VNF instance and a weight of a second virtual link between the second VNF instance and the third VNF instance for the third VNF instance, so that the third VNF instance forwards, according to the weight of the first virtual link and the weight of the second virtual link, the first service flow to the first VNF instance for processing and the second service flow to the second VNF instance for processing, where the third VNF instance is adjacent to the first VNF instance and the second VNF instance separately.

With reference to any one of the first aspect to the tenth possible implementation manner of the first aspect, in an eleventh possible implementation manner of the first aspect, the processor is specifically configured to acquire a running status of the first VNF instance monitored by the NS service management entity; and if the first VNF instance runs without loads within the preset time, instruct the NS management entity to terminate the first VNF instance.

With reference to any one of the first aspect to the tenth possible implementation manner of the first aspect, in a twelfth possible implementation manner of the first aspect, the processor is specifically configured to instruct the NS service management entity to: monitor a running status of the first VNF instance, and when detecting that the first VNF instance runs without loads within the preset time, terminate the first VNF instance.

With reference to any one of the first aspect to the twelfth possible implementation manner of the first aspect, in a thirteenth possible implementation manner of the first aspect, the processor is further configured to: after configuring the forwarding paths of the service flows in the NS, add the second VNF instance to a network function virtualization NFV instance repository; and start a VNF resource scaling process to perform resource scaling processing on the first VNF instance and the second VNF instance.

With reference to the thirteenth possible implementation manner of the first aspect, in a fourteenth possible implementation manner of the first aspect, the processor is further configured to delete the first VNF instance from the NFV instance repository.

According to a second aspect, an embodiment of the present application provides a network function virtualization orchestrator, including:

a receiving module, configured to receive an upgrade request message sent by a sender, where the upgrade request message is configured to request the network function virtualization orchestrator NFVO to upgrade a first software version corresponding to a first virtualized network function VNF to a second software version, the first software version corresponds to a first VNF instance, and the second software version corresponds to a second VNF instance;

an instantiating module, configured to instantiate the first VNF according to a preset VNFD of the second software version of the first VNF in a VNF catalog to obtain the second VNF instance;

a connecting module, configured to connect the second VNF instance to a network service NS in which the first VNF instance is located;

a configuring module, configured to configure forwarding paths of service flows in the NS, so that a first service flow is forwarded to the first VNF instance for processing and that a second service flow is forwarded to the second VNF instance for processing; and a determining and terminating module, configured to terminate, by the NFVO, the first VNF instance if it is determined that the first VNF instance runs without loads within a preset time.

With reference to the second aspect, in a first possible implementation manner of the second aspect, the instantiating module includes:

a determining and sending unit, configured to determine at least one first NS to which the first VNF instance belongs, and send an identifier of the first NS to the sender, where the first NS includes at least one virtualized network function forwarding graph VNFFG, a first VNFFG in the VNFFG includes the first VNF instance, and the first NS corresponds to a first network service descriptor NSD;

a determining and acquiring unit, configured to acquire a preset second NSD in an NS catalog according to an identifier of a second NS in an NS instance update request that is sent by the sender and received by the receiving module, and determine, according to the second NSD, to instantiate the first VNF, where the second NS is the to-be-updated first NS determined by the sender according to the identifier of the first NS, and the second NSD is a modified first NSD; and a first instantiating unit, configured to instantiate the first VNF according to the preset VNFD of the second software version of the first VNF in the VNF catalog to obtain the second VNF instance; where the receiving module is further configured to receive the NS instance update request sent by the sender, where the NS instance update request includes an identifier of at least one second NS.

With reference to the first possible implementation manner of the second aspect, in a second possible implementation manner of the second aspect, the connecting module is specifically configured to connect the second VNF instance to the second NS, and obtain an updated second NS, where the updated second NS includes the first VNFFG and a second VNFFG, the second VNFFG includes the second VNF instance, and a manner in which the second VNF instance in the second VNFFG is connected to other VNF instances in the second VNFFG is the same as a manner in which the first VNF instance in the first VNFFG is connected to other VNF instances in the first VNFFG.

With reference to the second possible implementation manner of the second aspect, in a third possible implementation manner of the second aspect, the configuring module is specifically configured to configure the first VNFFG and the second VNFFG for the service flows as the forwarding paths of the service flows, so that the first service flow is forwarded to the first VNFFG for processing, and that the second service flow is forwarded to the second VNFFG for processing.

With reference to the second possible implementation manner of the second aspect, in a fourth possible implementation manner of the second aspect, the configuring module is specifically configured to instruct an NS service management entity to configure the first VNFFG and the second VNFFG for the service flows as the forwarding paths of the service flows, so that the first service flow is forwarded to the first VNFFG for processing, and that the second service flow is forwarded to the second VNFFG for processing.

With reference to the second aspect, in a fifth possible implementation manner of the second aspect, the instantiating module further includes:

a checking and acquiring unit, configured to check whether the first VNF instance exists; and if the first VNF instance exists, acquire the preset VNFD of the second software version of the first VNF in the VNF catalog; and a second instantiating unit, configured to instantiate the first VNF according to the VNFD of the second software version of the first VNF to obtain the second VNF instance.

With reference to the fifth possible implementation manner of the second aspect, in a sixth possible implementation manner of the second aspect, the connecting module is specifically configured to connect the second VNF instance to the NS in which the first VNF instance is located, where a manner in which the second VNF instance is connected to other VNF instances in the NS is the same as a manner in which the first VNF instance is connected to other VNF instances in the NS.

With reference to the sixth possible implementation manner of the second aspect, in a seventh possible implementation manner of the second aspect, the configuring module is specifically configured to configure the first VNF instance and the second VNF instance for the service flows as nodes of the forwarding paths of the service flows in the NS, and generate a service flow forwarding table; and configure the service flow forwarding table for a third VNF instance, so that the third VNF instance forwards, according to the service flow forwarding table, the first service flow to the first VNF instance for processing and the second service flow to the second VNF instance for processing, where the third VNF instance is adjacent to the first VNF instance and the second VNF instance separately.

With reference to the sixth possible implementation manner of the second aspect, in an eighth possible implementation manner of the second aspect, the configuring module is specifically configured to configure a weight of a first virtual link between the first VNF instance and a third VNF instance and a weight of a second virtual link between the second VNF instance and the third VNF instance for the third VNF instance, so that the third VNF instance forwards, according to the weight of the first virtual link and the weight of the second virtual link, the first service flow to the first VNF instance for processing and the second service flow to the second VNF instance for processing, where the third VNF instance is adjacent to the first VNF instance and the second VNF instance separately.

With reference to the sixth possible implementation manner of the second aspect, in a ninth possible implementation manner of the second aspect, the configuring module is specifically configured to instruct an NS service management entity to: configure the first VNF instance and the second VNF instance for the service flows as nodes of the forwarding paths of the service flows in the NS and generate a service flow forwarding table; and instruct the NS service management entity to configure the service flow forwarding table for a third VNF instance, so that the third VNF instance forwards, according to the service flow forwarding table, the first service flow to the first VNF instance for processing and the second service flow to the second VNF instance for processing, where the third VNF instance is adjacent to the first VNF instance and the second VNF instance separately.

With reference to the sixth possible implementation manner of the second aspect, in a tenth possible implementation manner of the second aspect, the configuring module is specifically configured to instruct an NS service management entity to configure a weight of a first virtual link between the first VNF instance and a third VNF instance and a weight of a second virtual link between the second VNF instance and the third VNF instance for the third VNF instance, so that the third VNF instance forwards, according to the weight of the first virtual link and the weight of the second virtual link, the first service flow to the first VNF instance for processing and the second service flow to the second VNF instance for processing, where the third VNF instance is adjacent to the first VNF instance and the second VNF instance separately.

With reference to any one of the second aspect to the tenth possible implementation manner of the second aspect, in an eleventh possible implementation manner of the second aspect, the determining and terminating module is specifically configured to acquire a running status of the first VNF instance monitored by the NS service management entity; and if the first VNF instance runs without loads within the preset time, instruct the NS management entity to terminate the first VNF instance.

With reference to any one of the second aspect to the tenth possible implementation manner of the second aspect, in a twelfth possible implementation manner of the second aspect, the determining and terminating module is specifically configured to instruct the NS service management entity to: monitor a running status of the first VNF instance, and when detecting that the first VNF instance runs without loads within the preset time, terminate the first VNF instance.

With reference to any one of the second aspect to the twelfth possible implementation manner of the second aspect, in a thirteenth possible implementation manner of the second aspect, the network function virtualization orchestrator further includes:

an adding module, configured to add the second VNF instance to a network function virtualization NFV instance repository after the configuring module configures the forwarding paths of the service flows in the network service NS; and a resource scaling module, configured to start a VNF resource scaling process to perform resource scaling processing on the first VNF instance and the second VNF instance.

With reference to the thirteenth possible implementation manner of the second aspect, in a fourteenth possible implementation manner of the second aspect, the network function virtualization orchestrator further includes:

a deleting module, configured to delete the first VNF instance from the NFV instance repository after the determining and terminating module terminates the first VNF instance.

According to a third aspect, the present application provides a method for upgrading a virtualized network function, including:

receiving, by a network function virtualization orchestrator NFVO, an upgrade request message sent by a sender, where the upgrade request message is configured to request the NFVO to upgrade a first software version corresponding to a first virtualized network function VNF to a second software version, the first software version corresponds to a first VNF instance, and the second software version corresponds to a second VNF instance;

instantiating, by the NFVO, the first VNF according to a preset VNFD of the second software version of the first VNF in a VNF catalog to obtain the second VNF instance;

connecting, by the NFVO, the second VNF instance to a network service NS in which the first VNF instance is located;

configuring, by the NFVO, forwarding paths of service flows in the NS, so that a first service flow is forwarded to the first VNF instance for processing and that a second service flow is forwarded to the second VNF instance for processing; and terminating, by the NFVO, the first VNF instance if the NFVO determines that the first VNF instance runs without loads within a preset time.

With reference to the third aspect, in a first possible implementation manner of the third aspect, the instantiating, by the NFVO, the first VNF according to a preset VNFD of the second software version of the first VNF in a VNF catalog to obtain the second VNF instance, includes:

determining, by the NFVO, at least one first NS to which the first VNF instance belongs, and sending an identifier of the first NS to the sender, where the first NS includes at least one virtualized network function forwarding graph VNFFG, and a first VNFFG in the VNFFG includes the first VNF instance;

receiving, by the NFVO, an NS instance update request sent by the sender, where the NS instance update request includes an identifier of at least one second NS, the second NS is the to-be-updated first NS determined by the sender according to the identifier of the first NS, and the first NS corresponds to a first network service descriptor NSD;

acquiring, by the NFVO, a preset second NSD in an NS catalog according to the identifier of the second NS, and determining, according to the second NSD, to instantiate the first VNF, where the second NSD is a modified first NSD; and instantiating, by the NFVO, the first VNF according to the preset VNFD of the second software version of the first VNF in the VNF catalog to obtain the second VNF instance.

With reference to the first possible implementation manner of the third aspect, in a second possible implementation manner of the third aspect, the connecting, by the NFVO, the second VNF instance to a network service NS in which the first VNF instance is located, includes:

connecting, by the NFVO, the second VNF instance to the second NS, and obtaining an updated second NS, where the updated second NS includes the first VNFFG and a second VNFFG, the second VNFFG includes the second VNF instance, and a manner in which the second VNF instance in the second VNFFG is connected to other VNF instances in the second VNFFG is the same as a manner in which the first VNF instance in the first VNFFG is connected to other VNF instances in the first VNFFG With reference to the second possible implementation manner of the third aspect, in a third possible implementation manner of the third aspect, the configuring, by the NFVO, forwarding paths of service flows in the NS, includes:

configuring, by the NFVO, the first VNFFG and the second VNFFG for the service flows as the forwarding paths of the service flows, so that the first service flow is forwarded to the first VNFFG for processing, and that the second service flow is forwarded to the second VNFFG for processing.

With reference to the second possible implementation manner of the third aspect, in a fourth possible implementation manner of the third aspect, the configuring, by the NFVO, forwarding paths of service flows in the NS, includes:

instructing, by the NFVO, an NS service management entity to configure the first VNFFG and the second VNFFG for the service flows as the forwarding paths of the service flows, so that the first service flow is forwarded to the first VNFFG for processing, and that the second service flow is forwarded to the second VNFFG for processing.

With reference to the third aspect, in a fifth possible implementation manner of the third aspect, the instantiating, by the NFVO, the first VNF according to a preset VNFD of the second software version of the first VNF in a VNF catalog to obtain the second VNF instance, includes:

checking, by the NFVO, whether the first VNF instance exists;

if the first VNF instance exists, acquiring, by the NFVO, the preset VNFD of the second software version of the first VNF in the VNF catalog; and instantiating, by the NFVO, the first VNF according to the VNFD of the second software version of the first VNF to obtain the second VNF instance.

With reference to the fifth possible implementation manner of the third aspect, in a sixth possible implementation manner of the third aspect, the connecting, by the NFVO, the second VNF instance to a network service NS in which the first VNF instance is located, includes:

connecting, by the NFVO, the second VNF instance to the NS in which the first VNF instance is located, where a manner in which the second VNF instance is connected to other VNF instances in the NS is the same as a manner in which the first VNF instance is connected to other VNF instances in the NS.

With reference to the sixth possible implementation manner of the third aspect, in a seventh possible implementation manner of the third aspect, the configuring, by the NFVO, forwarding paths of service flows in the NS, includes:

configuring, by the NFVO, the first VNF instance and the second VNF instance for the service flows as nodes of the forwarding paths of the service flows in the NS, and generating a service flow forwarding table; and configuring, by the NFVO, the service flow forwarding table for a third VNF instance, so that the third VNF instance forwards, according to the service flow forwarding table, the first service flow to the first VNF instance for processing and the second service flow to the second VNF instance for processing, where the third VNF instance is adjacent to the first VNF instance and the second VNF instance separately.

With reference to the sixth possible implementation manner of the third aspect, in an eighth possible implementation manner of the third aspect, the configuring, by the NFVO, forwarding paths of service flows in the NS, includes:

configuring, by the NFVO, a weight of a first virtual link between the first VNF instance and a third VNF instance and a weight of a second virtual link between the second VNF instance and the third VNF instance for the third VNF instance, so that the third VNF instance forwards, according to the weight of the first virtual link and the weight of the second virtual link, the first service flow to the first VNF instance for processing and the second service flow to the second VNF instance for processing, where the third VNF instance is adjacent to the first VNF instance and the second VNF instance separately.

With reference to the sixth possible implementation manner of the third aspect, in a ninth possible implementation manner of the third aspect, the configuring, by the NFVO, forwarding paths of service flows in the NS, includes:

instructing, by the NFVO, an NS service management entity to configure the first VNF instance and the second VNF instance for the service flows as nodes of the forwarding paths of the service flows in the NS and generate a service flow forwarding table; and instructing, by the NFVO, the NS service management entity to configure the service flow forwarding table for a third VNF instance, so that the third VNF instance forwards, according to the service flow forwarding table, the first service flow to the first VNF instance for processing and the second service flow to the second VNF instance for processing, where the third VNF instance is adjacent to the first VNF instance and the second VNF instance separately.

With reference to the sixth possible implementation manner of the third aspect, in a tenth possible implementation manner of the third aspect, the configuring, by the NFVO, forwarding paths of service flows in the NS, includes:

instructing, by the NFVO, an NS service management entity to configure a weight of a first virtual link between the first VNF instance and a third VNF instance and a weight of a second virtual link between the second VNF instance and the third VNF instance for the third VNF instance, so that the third VNF instance forwards, according to the weight of the first virtual link and the weight of the second virtual link, the first service flow to the first VNF instance for processing and the second service flow to the second VNF instance for processing, where the third VNF instance is adjacent to the first VNF instance and the second VNF instance separately.

With reference to any one of the third aspect to the tenth possible implementation manner of the third aspect, in an eleventh possible implementation manner of the third aspect, the terminating, by the NFVO, the first VNF instance if the NFVO determines that the first VNF instance runs without loads within a preset time, specifically includes:

acquiring by the NFVO, a running status of the first VNF instance monitored by the NS service management entity; and if the first VNF instance runs without loads within the preset time, instructing, by the NFVO, the NS management entity to terminate the first VNF instance.

With reference to any one of the third aspect to the tenth possible implementation manner of the third aspect, in a twelfth possible implementation manner of the third aspect, the terminating, by the NFVO, the first VNF instance if the NFVO determines that the first VNF instance runs without loads within a preset time, specifically includes:

instructing, by the NFVO, the NS service management entity to monitor a running status of the first VNF instance, and when the first VNF instance runs without loads within the preset time, terminate the first VNF instance.

With reference to any one of the third aspect to the twelfth possible implementation manner of the third aspect, in a thirteenth possible implementation manner of the third aspect, after the configuring, by the NFVO, forwarding paths of service flows in the network service NS, the method further includes:

adding, by the NFVO, the second VNF instance to a network function virtualization NFV instance repository; and starting, by the NFVO, a VNF resource scaling process to perform resource scaling processing on the first VNF instance and the second VNF instance.

With reference to the thirteenth possible implementation manner of the third aspect, in a fourteenth possible implementation manner of the third aspect, after the terminating, by the NFVO, the first VNF instance, the method further includes:

deleting, by the NFVO, the first VNF instance from the NFV instance repository.

In the method for upgrading a virtualized network function and the network function virtualization orchestrator that are provided by the embodiments of the present application, a receiver receives an upgrade request message sent by a sender, where the upgrade request message is configured to request to upgrade a first software version of a first VNF to a second software version; and a processor instantiates the first VNF according to a preset VNFD of the second software version in a VNF catalog to obtain a second VNF instance, and connects the second VNF instance to an NS in which a first VNF instance is located; afterward, the processor configures forwarding paths of service flows in the NS, so that a first service flow is forwarded to the first VNF instance for processing and that a second service flow is forwarded to the second VNF instance for processing, so that the first VNF instance and the second VNF instance may process different service flows concurrently; and the first VNF instance is terminated when it is determined that the first VNF instance runs without loads within a preset time. In this way, seamless switching between the first VNF instance and the second VNF instance is implemented, interruption of running of a VNF instance of an old version, caused in a VNF upgrade process, is avoided, and real-time requirements of service flows are met.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show some embodiments of the present application, and persons of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the present application.

Figure 1:
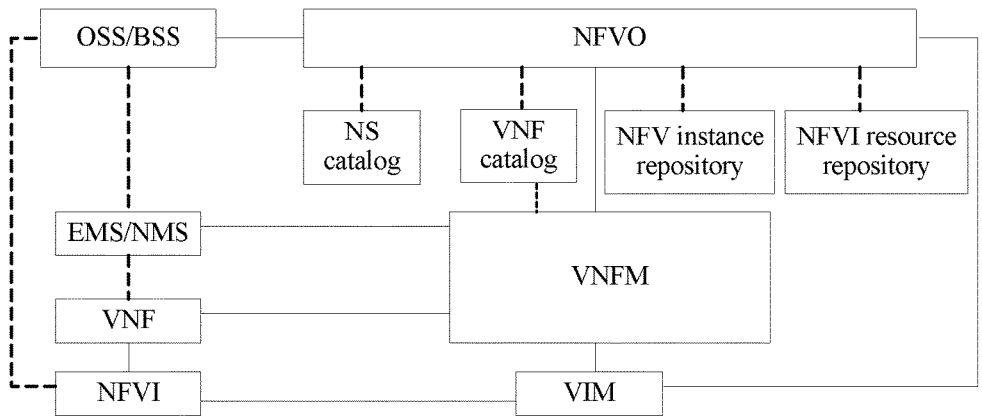
FIG. 1 is a schematic diagram of an NFV MANO architecture according to the present application.
Figure 2:
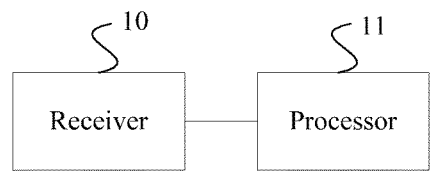
FIG. 2 is a schematic structural diagram of Embodiment 1 of a network function virtualization orchestrator according to the present application.

FIG. 2 is a schematic structural diagram of Embodiment 1 of a network function virtualization orchestrator according to the present application. The NFVO involved in this embodiment is applicable to an NFV architecture shown in FIG. 1. As shown in FIG. 2, the NFVO includes a receiver 10 and a processor 11. The receiver 10 is configured to receive an upgrade request message sent by a sender (Sender), where the upgrade request message is configured to request the NFVO to upgrade a first software version corresponding to a first VNF to a second software version, the first software version corresponds to a first VNF instance, and the second software version corresponds to a second VNF instance. The processor 11 is configured to:

instantiate the first VNF according to a preset VNFD of the second software version of the first VNF in a VNF catalog to obtain the second VNF instance; after connecting the second VNF instance to an NS in which the first VNF instance is located, configure forwarding paths of service flows in the NS, so that a first service flow is forwarded to the first VNF instance for processing and that a second service flow is forwarded to the second VNF instance for processing; and terminate, by the NFVO, the first VNF instance if it is determined that the first VNF instance runs without loads within a preset time.

Specifically, the sender sends the upgrade request message to the receiver 10, where the upgrade request message is configured to request the NFVO to upgrade the first software version corresponding to the first VNF in the NS to the second software version, the first software version corresponds to the first VNF instance, and the second software version corresponds to the second VNF instance. The first VNF may be one VNF, or may be multiple VNFs, which is not limited in the embodiment of the present application. If there are multiple first VNFs, it is only necessary to execute the following process repeatedly when a software version of each VNF is upgraded. In addition, the process of upgrading the first software version corresponding to the first VNF to the second software version is actually a process of obtaining the second VNF instance corresponding to the second software version.

After the receiver 10 receives the upgrade request message, the processor 11 verifies validity of the upgrade request message (the processor 11 has its own verification mechanism). When the upgrade request message is valid, the processor 11 reads the preset VNFD of the second software version of the first VNF from the VNF catalog, and instantiates the first VNF according to the VNFD of the second software version to obtain the second VNF instance. It should be noted that the VNFD preset in the VNF catalog mainly aims to describe a hardware resource requirement of software corresponding to the second software version of the first VNF, so that the software corresponding to the second software version may match hardware resources, so that the second software version in the first VNF can run and become the second VNF instance. That is, the first VNF instance is a VNF instance before upgrade (a VNF instance of an old version), and the second VNF instance is a VNF instance after upgrade (a VNF instance of a new version).

Generally, multiple VNF instances are connected by a virtual link to constitute one or more NSs. After obtaining the second VNF instance, the processor 11 connects the second VNF instance to the NS in which the first VNF instance is located. Further, the processor 11 configures the forwarding paths of the service flows in the NS, so that a first service flow transmitted from one or more senders can be forwarded to the first VNF instance for processing and that a second service flow can be forwarded to the second VNF instance for processing (herein the first service flow is an old service flow that is processed previously by the first VNF instance, and the second service flow is a new service flow). That is, the first VNF instance and the second VNF instance may run concurrently but process different service flows. It should be noted that herein the forwarding paths, configured by the processor 11, of the service flows in the NS, may be a service flow forwarding policy preset by the NFVO, or may be parameters related to the forwarding paths of the service flows. That is, the forwarding paths of the service flows may be learned indirectly by using the related parameters. Forms of the forwarding paths are not limited in the embodiment of the present application.

When the processor 11 determines that the first VNF instance runs without loads within a particular preset time (that is, the first service flow is not processed in the first VNF instance), the processor 11 determines that processing of the first service flow of the sender is completed, and therefore terminates the first VNF instance. Afterward, the new service flow (the second service flow) is forwarded to the second VNF instance for processing. In this way, soft switching between the new and old service flows is completed without interrupting the old service flow. Optionally, when there are multiple first VNF instances, and the processor 11 determines that all first VNF instances belonging to a same virtualized network function forwarding graph (Virtualized Network Function Forwarding Graph, VNFFG for short) in the NS run without loads within a particular preset time, the processor 11 may terminate all the first VNF instances in the VNFFG In the network function virtualization orchestrator provided by the embodiment of the present application, a receiver receives an upgrade request message sent by a sender, where the upgrade request message is configured to request to upgrade a first software version of a first VNF to a second software version; and a processor instantiates the first VNF according to a preset VNFD of the second software version in a VNF catalog to obtain a second VNF instance, and connects the second VNF instance to an NS in which a first VNF instance is located; afterward, the processor configures forwarding paths of service flows in the NS, so that a first service flow is forwarded to the first VNF instance for processing and that a second service flow is forwarded to the second VNF instance for processing, so that the first VNF instance and the second VNF instance may process different service flows concurrently; and the first VNF instance is terminated when it is determined that the first VNF instance runs without loads within a preset time. In this way, seamless switching between the first VNF instance and the second VNF instance is implemented, interruption of running of a VNF instance of an old version in a VNF upgrade process is avoided, and real-time requirements of service flows are met.

On a basis of the foregoing embodiment, in a first feasible implementation manner of the embodiment of the present application, the embodiment relates to a specific process in which the processor 11 obtains the second VNF instance. Specifically, the processor 11 is specifically configured to determine at least one first NS to which the first VNF instance belongs, and send an identifier of the first NS to the sender, where the first NS includes at least one VNFFG, a first VNFFG in the VNFFG includes the first VNF instance, and the first NS corresponds to a first NSD; acquire a preset second NSD in an NS catalog according to an identifier of a second NS in an NS instance update request that is sent by the sender and received by the receiver 10, and determine, according to the second NSD, to instantiate the first VNF, where the second NS is the to-be-updated first NS determined by the sender according to the identifier of the first NS, and the second NSD is a modified first NSD; and instantiate the first VNF according to the preset VNFD of the second software version of the first VNF in the VNF catalog to obtain the second VNF instance. The receiver 10 is further configured to receive the NS instance update request sent by the sender, where the NS instance update request includes an identifier of at least one second NS.

Specifically, after the receiver 10 receives the upgrade request sent by the sender, the processor 11 verifies validity of the upgrade request message (the processor 11 has its own verification mechanism). When the upgrade request message is valid, the processor 11 determines the first NS in which the first VNF instance corresponding to the first software version of the first VNF is. The first NS may be one or more NSs. The first NS includes at least one VNFFG, and the first VNFFG in the VNFFG includes the first VNF instance. In addition, the first NS corresponds to the first NSD. The first NSD mainly aims to describe how many VNFFGs are in the first NS, how many VNF instances are included in each VNFFG and a connection relationship between VNF instances. The processor 11 sends identifiers of the first NSs to the sender, so that the sender determines, according to the identifiers of the first NSs, which first NS to update, namely, the second NS mentioned in the following embodiment, where the second NS is the to-be-updated first NS determined by the sender.

The sender adds the identifier of the determined second NS to the NS instance update request and sends the request to the receiver 10, where the NS instance update request includes the identifier of the at least one second NS. After receiving the NS instance update request, the receiver 10 instructs the processor 11 to acquire the preset second NSD from the NS catalog according to the identifier of the second NS, where the second NSD is the modified first NSD. That is, the second NSD mainly aims to describe what NS the first NS is updated to. For example, the second NSD describes how many VNFFGs and how many VNF instances are included in the updated first NS and how each VNF instance is connected to the NS.

After acquiring the second NSD in the NS catalog, the processor 11 checks, according to a specific description of the second NSD, VNF instances corresponding to software versions of which VNFs already exist and VNF instances corresponding to software versions of which VNFs do not exist in the second NS. That is, the processor 11 may know, according to the second NSD, a specific VNF that will be instantiated, and implement a process of software version upgrade of the VNF. Because the first VNF instance corresponding to the first software version of the first VNF in the second NS already exists, but a VNF instance corresponding to the second software version of the first VNF does not exist, the processor 11 determines to instantiate the first VNF instance. The processor 11 may acquire the preset VNFD of the second software version of the first VNF from the VNF catalog, and instantiate the first VNF according to the VNFD of the second software version to obtain the second VNF instance.

It should be noted that the preset second NSD in the NS catalog may be obtained in an NSD modification process (for the NSD modification process, refer to the prior art), but the first NSD may be modified by the processor 11 before or after the receiver 10 receives the NS instance update request sent by the sender, and is prestored in the NS catalog; the preset VNFD of the second software version of the first VNF in the VNF catalog may be obtained in a VNF loading process (for the VNF loading process, refer to the prior art), where the VNF loading process is actually a process of loading a second VNFD to the VNF catalog, and the VNF loading process may also be executed by the processor 11 before or after the receiver 10 receives the NS instance update request sent by the sender.

On a basis of the foregoing Embodiment 1, in a second feasible implementation manner of the embodiment of the present application, the embodiment relates to a specific process in which the processor 11 obtains the second VNF instance. Specifically, the processor 11 is specifically configured to check whether the first VNF instance exists; if the first VNF instance exists, acquire the preset VNFD of the second software version of the first VNF in the VNF catalog; and instantiate the first VNF according to the VNFD of the second software version of the first VNF to obtain the second VNF instance.

Specifically, after the receiver 10 receives the upgrade request sent by the sender, the processor 11 verifies validity of the update request message (the processor 11 has its own verification mechanism). When the upgrade request message is valid, the processor 11 checks whether the first VNF instance exists in the NS. When the first VNF instance exists, the processor returns, to the sender, a response indicating that the upgrade is agreed, acquires the preset VNFD of the second software version of the first VNF in the VNF catalog, and instantiates the first VNF according to the VNFD of the second software version of the first VNF to obtain the second VNF instance. It should be noted that the preset VNFD of the second software version of the first VNF in the VNF catalog may be obtained in a VNF loading process (for the VNF loading process, refer to the prior art); the VNF loading process is actually a process of loading a second VNFD to the VNF catalog, and the VNF loading process may also be executed by the processor 11 before or after the receiver receives the NS instance update request sent by the sender.

In the network function virtualization orchestrator provided by the embodiment of the present application, a receiver receives an upgrade request message sent by a sender, where the upgrade request message is configured to request to upgrade a first software version of a first VNF to a second software version; and a processor instantiates the first VNF according to a preset VNFD of the second software version in a VNF catalog to obtain a second VNF instance, and connects the second VNF instance to an NS in which a first VNF instance is located; afterward, the processor configures forwarding paths of service flows in the NS, so that a first service flow is forwarded to the first VNF instance for processing and that a second service flow is forwarded to the second VNF instance for processing, so that the first VNF instance and the second VNF instance may process different service flows concurrently; and the first VNF instance is terminated when it is determined that the first VNF instance runs without loads within a preset time. In this way, seamless switching between the first VNF instance and the second VNF instance is implemented, interruption of running of a VNF instance of an old version in a VNF upgrade process is avoided, and real-time requirements of services are met.

As the process of obtaining the second VNF instance varies, a process in which the processor 11 connects the second VNF instance to the NS and configures the forwarding paths of the service flows in the NS also varies, which is described separately hereinafter.

Figure 3:
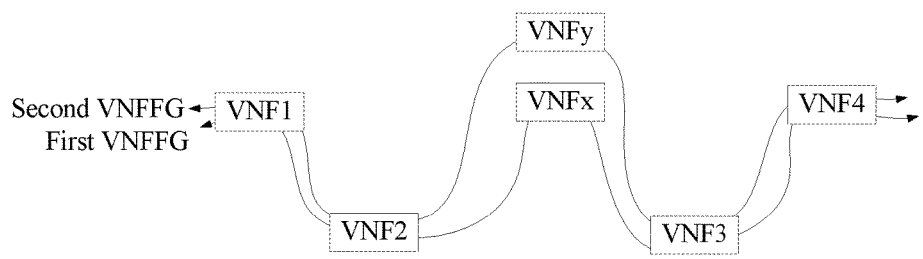
FIG. 3 is a first schematic connection diagram of a second VNF instance in an NS according to the present application.
Figure 4:
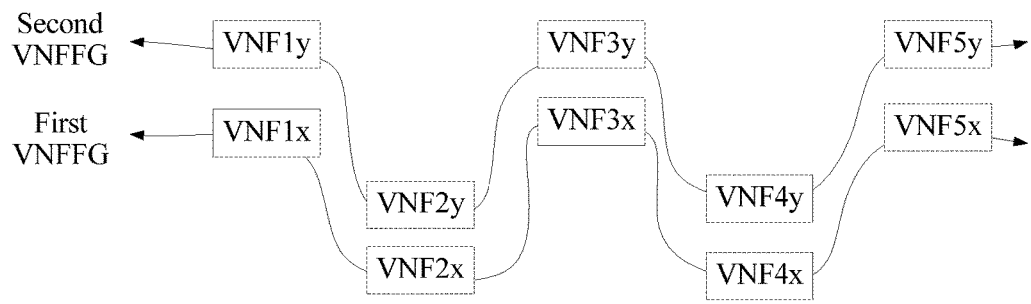
FIG. 4 is a second schematic connection diagram of a second VNF instance in an NS according to the present application.

On a basis of the first possible implementation manner of the embodiment of the present application, the embodiment relates to a specific process in which the processor 11 connects the obtained second VNF instance to the NS and configures the forwarding paths of the service flows in the NS. Specifically:

After obtaining the second VNF instance, the processor 11 connects the second VNF instance to the second NS, and obtains an updated second NS, where the updated second NS includes the first VNFFG and a second VNFFG, the second VNFFG includes the second VNF instance, and a manner in which the second VNF instance in the second VNFFG is connected to other VNF instances in the second VNFFG is the same as a manner in which the first VNF instance in the first VNFFG is connected to other VNF instances in the first VNFFG. That is, a second VNFFG is added to the second NS, and the second NS is updated. For example, as shown in FIG. 3, the updated second NS includes two VNFFGs, which are the first VNFFG and the second VNFFG (the first VNFFG is the original VNFFG in the second NS, and the second VNFFG is the added VNFFG including the second VNF instance). The first VNFFG includes five instances: VNF1, VNF2, VNF3, VNFx, and VNF4, where VNFx represents the first VNF instance. The second VNFFG includes five VNF instances: VNF1, VNF2, VNF3, VNFy, and VNF4, where VNFy represents the second VNF instance. Referring to FIG. 3, in the first VNFFG, the VNFx, VNF1, VNF2, VNF3, and VNF4 are connected in a cascading manner. Therefore, in the second VNFFG, the VNFy, VNF1, VNF2, VNF3, and VNF4 are also connected in a cascading manner. For another example, referring to FIG. 4, the updated second NS includes two VNFFGs, which are the first VNFFG and the second VNFFG (the first VNFFG is the original VNFFG in the second NS, and the second VNFFG is the added VNFFG including the second VNF instance). The first VNFFG includes five VNF instances: VNFx1, VNF2x, VNF3x, VNF4x, and VNFSx, where all the VNFx1, VNF2x, VNF3x, VNF4x, and VNFSx represent first VNF instances. The second VNFFG includes five VNF instances: VNF1y, VNF2y, VNF3y, VNF4y, and VNF5y, where all the VNF1y, VNF2y, VNF3y, VNF4y, and VNF5y represent second VNF instances. That is, in the example in FIG. 4, software versions of all the VNFs included in the second NS are upgraded, and VNF instances of new software versions are obtained. In the first VNFFG, the VNFx1, VNF2x, VNF3x, VNF4x, and VNF5x are connected in a cascading manner. Therefore, in the second VNFFG, the VNF1y, VNF2y, VNF3y, VNF4y, and VNF5y are also connected in a cascading manner.

Still further, the processor 11 may configure the forwarding paths of the service flows in the NS in two implementation manners, which are respectively as follows:

First manner: The processor 11 configures the first VNFFG and the second VNFFG for the service flows as the forwarding paths of the service flows, so that the first service flow is forwarded to the first VNFFG for processing, and that the second service flow is forwarded to the second VNFFG for processing.

Second manner: The processor 11 instructs an NS service management entity to configure the first VNFFG and the second VNFFG for the service flows as the forwarding paths of the service flows, so that the first service flow is forwarded to the first VNFFG for processing, and that the second service flow is forwarded to the second VNFFG for processing.

Regardless of the first manner or the second manner, the forwarding paths may be implemented in multiple manners. For example, policy-based routing is used, which requires that service flows should be forwarded according to source addresses, so that a service flow coming from a new source address is forwarded to a new VNFFG; or a tunneling technology is used, and forwarding paths of new and old data flows are distinguished by using tunnel configurations; or a service function chaining (Service Function Chaining, SFC for short) mechanism defined by the IETF or other service chaining (service chain) mechanisms are used.

In addition, it should be noted that in the foregoing embodiment, after the processor 11 configures the forwarding paths of the service flows in the NS, so that the first service flow is forwarded to the first VNF instance and that the second service flow is forwarded to the second VNF instance, the processor 11 determines whether the first VNF instance runs without loads within a preset time, and if yes, the processor 11 terminates the first VNF instance in time. Optionally, the processor 11 may further acquire a running status of the first VNF instance monitored by the NS service management entity, that is, the running status of the VNF instance is monitored by the NS service management entity, and the NS service management entity notifies the monitored running status of the first VNF instance to the processor 11; and if the first VNF instance runs without loads within the preset time, the processor 11 instructs the NS management entity to terminate the first VNF instance. Alternatively, the processor 11 may instruct the NS service management entity to monitor a running status of the first VNF instance and instruct the NS service management entity to terminate the first VNF instance when it is detected that the first VNF instance runs without loads within the preset time. That is, the processor 11 gives one instruction to the NS service management entity: as long as the NS service management entity detects that the first VNF instance runs without loads within the preset time, the NS service management entity directly terminates the first VNF instance but does not need to send the monitored running status of the first VNF instance to the processor 11.

Further, the processor 11 adds the second VNF instance to an NFV instance repository after the processor 11 configures the forwarding paths of the service flows in the NS, so that the first service flow is forwarded to the first VNF instance and that the second service flow is forwarded to the second VNF instance. In this case, the second VNF instance and the first VNF instance work simultaneously, but loads of the second VNF instance increase and loads of the first VNF instance decrease gradually. To ensure efficient use of resources, the processor 11 may start the resource scaling process, reduce resources used by the first VNF instance, and increase resources used by the second VNF instance, to ensure efficient rational use of resources. In addition, after terminating the first VNF instance, the processor 11 deletes an entry of the first VNF instance from the NFV instance repository to ensure accuracy of content of the NFV instance repository.

In the network function virtualization orchestrator provided by the embodiment of the present application, a receiver receives an upgrade request message sent by a sender, where the upgrade request message is configured to request to upgrade a first software version of a first VNF to a second software version; and a processor instantiates the first VNF according to a preset VNFD of the second software version in a VNF catalog to obtain a second VNF instance, and connects the second VNF instance to an NS in which a first VNF instance is located; afterward, the processor configures forwarding paths of service flows in the NS, so that a first service flow is forwarded to the first VNF instance for processing and that a second service flow is forwarded to the second VNF instance for processing, so that the first VNF instance and the second VNF instance may process different service flows concurrently; and the first VNF instance is terminated when it is determined that the first VNF instance runs without loads within a preset time. In this way, seamless switching between the first VNF instance and the second VNF instance is implemented, interruption of running of a VNF instance of an old version in a VNF upgrade process is avoided, and real-time requirements of services are met; and rational use of resources is ensured by starting a resource scaling process.

On a basis of the second possible implementation manner of the embodiment of the present application, the embodiment relates to another specific process in which the processor 11 connects the obtained second VNF instance to the NS and configures the forwarding paths of the service flows in the NS. Specifically:

The processor 11 connects the obtained second VNF instance to the NS in which the first VNF instance is located, where a manner in which the second VNF instance is connected to other VNF instances in the NS is the same as a manner in which the first VNF instance is connected to other VNF instances in the NS. Herein actually the second VNF instance is connected to the NS as an extension of the first VNF instance. For a specific connection manner, refer to FIG. 3.

Still further, the processor 11 may configure the forwarding paths of the service flows in the NS in four implementation manners, which are respectively as follows:

First manner: The processor 11 configures the first VNF instance and the second VNF instance for the service flows as nodes of the forwarding paths of the service flows in the NS, and generates a service flow forwarding table; afterward, the processor 11 configures the service flow forwarding table for a third VNF instance, so that the third VNF instance forwards, according to the service flow forwarding table, the first service flow to the first VNF instance for processing and the second service flow to the second VNF instance for processing, where the third VNF instance is adjacent to the first VNF instance and the second VNF instance separately.

Second manner: The processor 11 instructs an NS service management entity to configure the first VNF instance and the second VNF instance for the service flows as nodes of the forwarding paths of the service flows in the NS and generate a service flow forwarding table; afterward, the processor 11 configures the service flow forwarding table for a third VNF instance, so that the third VNF instance forwards, according to the service flow forwarding table, the first service flow to the first VNF instance for processing and the second service flow to the second VNF instance for processing, where the third VNF instance is adjacent to the first VNF instance and the second VNF instance separately.

Third manner: The processor 11 configures a weight of a first virtual link between the first VNF instance and a third VNF instance and a weight of a second virtual link between the second VNF instance and the third VNF instance for the third VNF instance, so that the third VNF instance forwards, according to the weight of the first virtual link and the weight of the second virtual link, the first service flow to the first VNF instance for processing and the second service flow to the second VNF instance for processing, where the third VNF instance is adjacent to the first VNF instance and the second VNF instance separately.

Fourth manner: The processor 11 instructs an NS service management entity to configure a weight of a first virtual link between the first VNF instance and a third VNF instance and a weight of a second virtual link between the second VNF instance and the third VNF instance for the third VNF instance, so that the third VNF instance forwards, according to the weight of the first virtual link and the weight of the second virtual link, the first service flow to the first VNF instance for processing and the second service flow to the second VNF instance for processing, where the third VNF instance is adjacent to the first VNF instance and the second VNF instance separately.

For the first and second implementation manners, the service flow forwarding table may be a mapping relationship table of different service flows and forwarding nodes, that is, the third VNF instance knows, according to the mapping relationship table of service flows and forwarding nodes, that different service flows are forwarded to corresponding nodes for processing.

For the third and fourth implementation manners, optionally, a COST value of the virtual link between the second VNF instance and the third VNF instance may be configured, so that the COST value is far less than a COST value of the virtual link between the first VNF instance and the third VNF instance; if the NFVO or the NS service management entity does not know the COST value of the virtual link between the first VNF instance and the third VNF instance, an extremely low COST value may be configured for the virtual link between the second VNF instance and the third VNF instance, to ensure that the COST value of that virtual link is less than the COST value of the virtual link between the first VNF instance and the third VNF instance. Therefore, the third VNF instance may select a link with a low COST value according to the configured forwarding paths. Old service flows are still processed by the first VNF instance and new service flows are forwarded to the second VNF instance for processing.

In addition, it should be noted that in the foregoing embodiment, after the processor 11 configures the forwarding paths of the service flows in the NS, so that the first service flow is forwarded to the first VNF instance and that the second service flow is forwarded to the second VNF instance, the processor 11 determines whether the first VNF instance runs without loads within a preset time, and if yes, the processor 11 terminates the first VNF instance in time. Optionally, the processor 11 may further acquire a running status of the first VNF instance monitored by the NS service management entity, that is, the running status of the VNF instance is monitored by the NS service management entity, and the NS service management entity notifies the monitored running status of the first VNF instance to the processor 11; and if the first VNF instance runs without loads within the preset time, the processor 11 instructs the NS management entity to terminate the first VNF instance. Alternatively, the processor 11 may instruct the NS service management entity to monitor a running status of the first VNF instance and instruct the NS service management entity to terminate the first VNF instance when it is detected that the first VNF instance runs without loads within the preset time. That is, the processor 11 gives one instruction to the NS service management entity: as long as the NS service management entity detects that the first VNF instance runs without loads within the preset time, the NS service management entity directly terminates the first VNF instance but does not need to send the monitored running status of the first VNF instance to the processor 11.

Further, the processor 11 adds the second VNF instance to an NFV instance repository after the processor 11 configures the forwarding paths of the service flows in the NS, so that the first service flow is forwarded to the first VNF instance and that the second service flow is forwarded to the second VNF instance. In this case, the second VNF instance and the first VNF instance work simultaneously, but loads of the second VNF instance increase and loads of the first VNF instance decrease gradually. To ensure efficient use of resources, the processor 11 may start the resource scaling process, reduce resources used by the first VNF instance, and increase resources used by the second VNF instance, to ensure efficient rational use of resources. In addition, after terminating the first VNF instance, the processor 11 deletes an entry of the first VNF instance from the NFV instance repository to ensure accuracy of content of the NFV instance repository.

In the network function virtualization orchestrator provided by the embodiment of the present application, a receiver receives an upgrade request message sent by a sender, where the upgrade request message is configured to request to upgrade a first software version of a first VNF to a second software version; and a processor instantiates the first VNF according to a preset VNFD of the second software version in a VNF catalog to obtain a second VNF instance, and connects the second VNF instance to an NS in which a first VNF instance is located; afterward, the processor configures forwarding paths of service flows in the NS, so that a first service flow is forwarded to the first VNF instance for processing and that a second service flow is forwarded to the second VNF instance for processing, so that the first VNF instance and the second VNF instance may process different service flows concurrently; and the first VNF instance is terminated when it is determined that the first VNF instance runs without loads within a preset time. In this way, seamless switching between the first VNF instance and the second VNF instance is implemented, interruption of running of a VNF instance of an old version in a VNF upgrade process is avoided, and real-time requirements of services are met; and rational use of resources is ensured by starting a resource scaling process.

Figure 5:
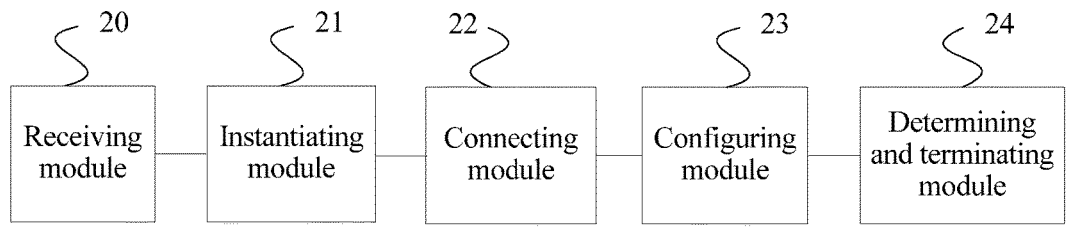
FIG. 5 is a schematic structural diagram of Embodiment 2 of a network function virtualization orchestrator according to the present application.

FIG. 5 is a schematic structural diagram of Embodiment 2 of a network function virtualization orchestrator according to the present application. The NFVO involved in this embodiment is applicable to an NFV architecture diagram shown in FIG. 1. As shown in FIG. 5, the NFVO includes a receiving module 20, an instantiating module 21, a connecting module 22, a configuring module 23, and a determining and terminating module 24. The receiving module 20 is configured to receive an upgrade request message sent by a sender, where the upgrade request message is configured to request the network function virtualization orchestrator NFVO to upgrade a first software version corresponding to a first virtualized network function VNF to a second software version, the first software version corresponds to a first VNF instance, and the second software version corresponds to a second VNF instance. The instantiating module 21 is configured to instantiate the first VNF according to a preset VNFD of the second software version of the first VNF in a VNF catalog to obtain the second VNF instance. The connecting module 22 is configured to connect the second VNF instance to a network service NS in which the first VNF instance is located. The configuring module 23 configured to configure forwarding paths of service flows in the NS, so that a first service flow is forwarded to the first VNF instance for processing and that a second service flow is forwarded to the second VNF instance for processing. The determining and terminating module 24 is configured to terminate, by the NFVO, the first VNF instance if it is determined that the first VNF instance runs without loads within a preset time.

Specifically, the sender sends the upgrade request message to the receiving module 20, where the upgrade request message is configured to request the NFVO to upgrade the first software version corresponding to the first VNF in the NS to the second software version, the first software version corresponds to the first VNF instance, and the second software version corresponds to the second VNF instance. The first VNF may be one VNF, or may be multiple VNFs, which is not limited in the embodiment of the present application. If there are multiple first VNFs, it is only necessary to execute the following process repeatedly when a software version of each VNF is upgraded. In addition, the process of upgrading the first software version corresponding to the first VNF to the second software version is actually a process of obtaining the second VNF instance corresponding to the second software version.

After the receiving module 20 receives the upgrade request message, the instantiating module 21 verifies validity of the upgrade request message (the NFVO has its own verification mechanism). When the upgrade request message is valid, the instantiating module 21 reads the preset VNFD of the second software version of the first VNF from the VNF catalog, and instantiates the first VNF according to the VNFD of the second software version to obtain the second VNF instance. It should be noted that the VNFD preset in the VNF catalog mainly aims to describe a hardware resource requirement of software corresponding to the second software version of the first VNF, so that the software corresponding to the second software version may match hardware resources, so that the second software version in the first VNF can run and become the second VNF instance. That is, the first VNF instance is a VNF instance before upgrade (a VNF instance of an old version), and the second VNF instance is a VNF instance after upgrade (a VNF instance of a new version).

Generally, multiple VNF instances are connected by a virtual link to constitute one or more NSs. After the instantiating module 21 obtains the second VNF instance, the connecting module 22 connects the second VNF instance to the NS in which the first VNF instance is located. Further, the configuring module 23 configures the forwarding paths of the service flows in the NS, so that a first service flow transmitted from one or more senders can be forwarded to the first VNF instance for processing and that a second service flow can be forwarded to the second VNF instance for processing (herein the first service flow is an old service flow that is processed previously by the first VNF instance, and the second service flow is a new service flow). That is, the first VNF instance and the second VNF instance may run concurrently but process different service flows. It should be noted that herein the forwarding paths, configured by the configuring module 23, of the service flows in the NS, may be a service flow forwarding policy preset by the NFVO, or may be parameters related to the forwarding paths of the service flows. That is, the forwarding paths of the service flows may be learned indirectly by using the related parameters. Forms of the forwarding paths are not limited in the embodiment of the present application.

When the determining and terminating module 24 determines that the first VNF instance runs without loads within a particular preset time (that is, the first service flow is not processed in the first VNF instance), the determining and terminating module 24 determines that processing of the first service flow of the sender is completed, and therefore terminates the first VNF instance. Afterward, the new service flow (the second service flow) is forwarded to the second VNF instance for processing. In this way, soft switching between the new and old service flows is completed without interrupting the old service flow. Optionally, when there are multiple first VNF instances, and the determining and terminating module 24 determines that all first VNF instances belonging to a same VNFFG in the NS run without loads within a particular preset time, the determining and terminating module 24 may terminate all the first VNF instances in the VNFFG In the network function virtualization orchestrator provided by the embodiment of the present application, a receiving module receives an upgrade request message sent by a sender, where the upgrade request message is configured to request to upgrade a first software version of a first VNF to a second software version; an instantiating module instantiates the first VNF according to a preset VNFD of the second software version in a VNF catalog to obtain a second VNF instance, and a connecting module connects the second VNF instance to an NS in which a first VNF instance is located; afterward, a configuring module configures forwarding paths of service flows in the NS, so that a first service flow is forwarded to the first VNF instance for processing and that a second service flow is forwarded to the second VNF instance for processing, so that the first VNF instance and the second VNF instance may process different service flows concurrently; and a determining and terminating module terminates the first VNF instance when it is determined that the first VNF instance runs without loads within a preset time. In this way, seamless switching between the first VNF instance and the second VNF instance is implemented, interruption of running of a VNF instance of an old version in a VNF upgrade process is avoided, and real-time requirements of service flows are met.

Figure 6:
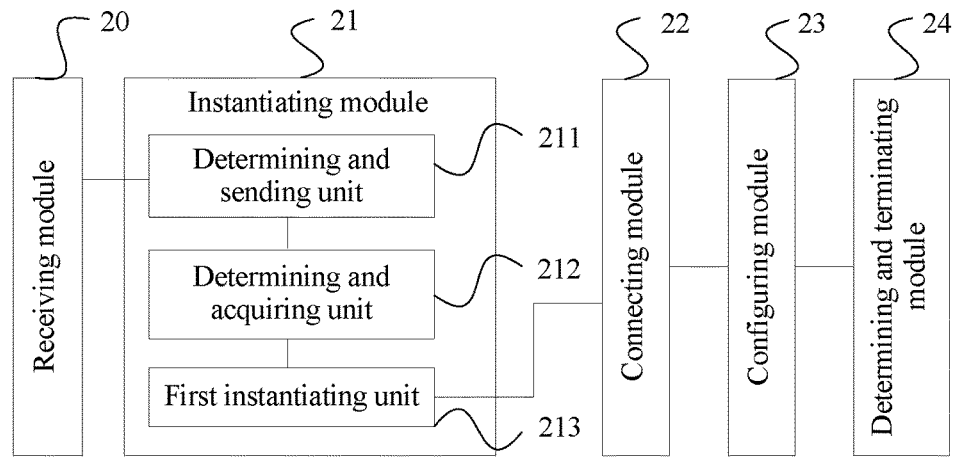
FIG. 6 is a schematic structural diagram of Embodiment 3 of a network function virtualization orchestrator according to the present application.

FIG. 6 is a schematic structural diagram of Embodiment 3 of a network function virtualization orchestrator according to the present application. On a basis of the foregoing Embodiment 2, this embodiment relates to a specific process in which the instantiating module 21 obtains the second VNF instance. Specifically, the instantiating module 21 specifically includes a determining and sending unit 211, a determining and acquiring unit 212, and a first instantiating unit 213. The determining and sending unit 211 is configured to determine at least one first NS to which the first VNF instance belongs, and send an identifier of the first NS to the sender, where the first NS includes at least one virtualized network function forwarding graph VNFFG, a first VNFFG in the VNFFG includes the first VNF instance, and the first NS corresponds to a first network service descriptor NSD. The determining and acquiring unit 212 is configured to acquire a preset second NSD in an NS catalog according to an identifier of a second NS in an NS instance update request that is sent by the sender and received by the receiving module 20, and determine, according to the second NSD, to instantiate the first VNF, where the second NS is the to-be-updated first NS determined by the sender according to the identifier of the first NS, and the second NSD is a modified first NSD. The first instantiating unit 213 is configured to instantiate the first VNF according to the preset VNFD of the second software version of the first VNF in the VNF catalog to obtain the second VNF instance. The receiving module 20 is further configured to receive the NS instance update request sent by the sender, where the NS instance update request includes an identifier of at least one second NS.

Specifically, after the receiving module 20 receives the upgrade request sent by the sender, the instantiating module 21 verifies validity of the upgrade request message; when the upgrade request message is valid, the determining and sending unit 211 determines the first NS in which the first VNF instance corresponding to the first software version of the first VNF is. The first NS may be one or more NSs. The first NS includes at least one VNFFG, and the first VNFFG in the VNFFG includes the first VNF instance. In addition, the first NS corresponds to the first NSD. The first NSD mainly aims to describe how many VNFFGs are in the first NS, how many VNF instances are included in each VNFFG and a connection relationship between VNF instances. The determining and sending unit 211 sends identifiers of the first NSs to the sender, so that the sender determines, according to the identifiers of the first NSs, which first NS to update, namely, the second NS mentioned in the following embodiment, where the second NS is the to-be-updated first NS determined by the sender.

The sender adds the identifier of the determined second NS to the NS instance update request and sends the request to the receiving module 20, where the NS instance update request includes the identifier of the at least one second NS. After receiving the NS instance update request, the receiving module 20 instructs the determining and acquiring unit 212 to acquire the preset second NSD from the NS catalog according to the identifier of the second NS, where the second NSD is the modified first NSD. That is, the second NSD mainly aims to describe what NS the first NS is updated to. For example, the second NSD describes how many VNFFGs and how many VNF instances are included in the updated first NS and how each VNF instance is connected to the NS.

After acquiring the second NSD in the NS catalog, the determining and acquiring unit 212 checks, according to a specific description of the second NSD, VNF instances corresponding to software versions of which VNFs already exist and VNF instances corresponding to software versions of which VNFs do not exist in the second NS. That is, the determining and acquiring unit 212 may know, according to the second NSD, a specific VNF that will be instantiated, and thereby implement a process of software version upgrade of the VNF. Because the first VNF instance corresponding to the first software version of the first VNF in the second NS already exists, but a VNF instance corresponding to the second software version of the first VNF does not exist, the determining and acquiring unit 212 determines to instantiate the first VNF instance. Afterward, the first instantiating unit 213 may acquire the preset VNFD of the second software version of the first VNF from the VNF catalog, and instantiate the first VNF according to the VNFD of the second software version to obtain the second VNF instance.

It should be noted that the preset second NSD in the NS catalog may be obtained in an NSD modification process (for the NSD modification process, refer to the prior art), but the first NSD may be modified by the instantiating module 21 before or after the receiving module 20 receives the NS instance update request sent by the sender, and is prestored in the NS catalog; the preset VNFD of the second software version of the first VNF in the VNF catalog may be obtained in a VNF loading process (for the VNF loading process, refer to the prior art), where the VNF loading process is actually a process of loading a second VNFD to the VNF catalog, and the VNF loading process may also be executed by the instantiating module 21 before or after the receiving module 20 receives the NS instance update request sent by the sender.

In the network function virtualization orchestrator provided by the embodiment of the present application, a receiving module receives an upgrade request message sent by a sender, where the upgrade request message is configured to request to upgrade a first software version of a first VNF to a second software version; an instantiating module instantiates the first VNF according to a preset VNFD of the second software version in a VNF catalog to obtain a second VNF instance, and a connecting module connects the second VNF instance to an NS in which a first VNF instance is located; afterward, a configuring module configures forwarding paths of service flows in the NS, so that a first service flow is forwarded to the first VNF instance for processing and that a second service flow is forwarded to the second VNF instance for processing, so that the first VNF instance and the second VNF instance may process different service flows concurrently; and a determining and terminating module terminates the first VNF instance when it is determined that the first VNF instance runs without loads within a preset time. In this way, seamless switching between the first VNF instance and the second VNF instance is implemented, interruption of running of a VNF instance of an old version in a VNF upgrade process is avoided, and real-time requirements of service flows are met.

Figure 7:
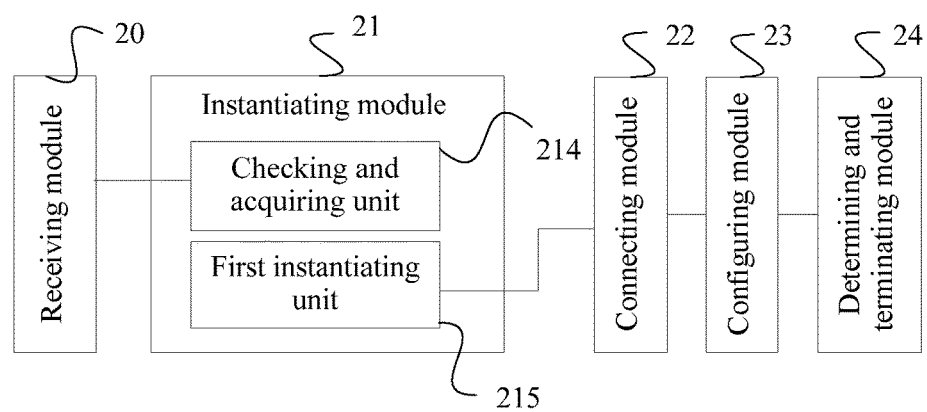
FIG. 7 is a schematic structural diagram of Embodiment 4 of a network function virtualization orchestrator according to the present application.

FIG. 7 is a schematic structural diagram of Embodiment 4 of a network function virtualization orchestrator according to the present application. On a basis of the foregoing Embodiment 2, this embodiment relates to another specific process in which the instantiating module 21 obtains the second VNF instance. Specifically, the instantiating module 21 specifically includes: a checking and acquiring unit 214, configured to check whether the first VNF instance exists; and if the first VNF instance exists, acquire the preset VNFD of the second software version of the first VNF in the VNF catalog; and a second instantiating unit 215, configured to instantiate the first VNF according to the VNFD of the second software version of the first VNF to obtain the second VNF instance.

Specifically, after the receiving module 20 receives the upgrade request sent by the sender, the instantiating module 21 verifies validity of the upgrade request message; when the upgrade request is valid, the checking and acquiring unit 214 checks whether the first VNF instance exists. When the first VNF instance exists, the checking and acquiring unit 214 returns, to the sender, a response indicating that the upgrade is agreed, and acquires the preset VNFD of the second software version of the first VNF in the VNF catalog, and the second instantiating unit 215 instantiates the first VNF according to the VNFD of the second software version of the first VNF to obtain the second VNF instance. It should be noted that the preset VNFD of the second software version of the first VNF in the VNF catalog may be obtained in a VNF loading process (for the VNF loading process, refer to the prior art); the VNF loading process is actually a process of loading a second VNFD to the VNF catalog, and the VNF loading process may also be executed by the instantiating module 21 before or after the receiving module 20 receives the NS instance update request sent by the sender.

In the network function virtualization orchestrator provided by the embodiment of the present application, a receiving module receives an upgrade request message sent by a sender, where the upgrade request message is configured to request to upgrade a first software version of a first VNF to a second software version; an instantiating module instantiates the first VNF according to a preset VNFD of the second software version in a VNF catalog to obtain a second VNF instance, and a connecting module connects the second VNF instance to an NS in which a first VNF instance is located; afterward, a configuring module configures forwarding paths of service flows in the NS, so that a first service flow is forwarded to the first VNF instance for processing and that a second service flow is forwarded to the second VNF instance for processing, so that the first VNF instance and the second VNF instance may process different service flows concurrently; and a determining and terminating module terminates the first VNF instance when it is determined that the first VNF instance runs without loads within a preset time. In this way, seamless switching between the first VNF instance and the second VNF instance is implemented, interruption of running of a VNF instance of an old version in a VNF upgrade process is avoided, and real-time requirements of service flows are met.

As the process of obtaining the second VNF instance in the foregoing Embodiment 3 and Embodiment 4 varies, a process in which the connecting module 22 connects the second VNF instance to the NS and the configuring module 23 configures the forwarding paths of the service flows in the NS also varies, which is described separately hereinafter.

On a basis of the foregoing Embodiment 3, this embodiment relates to a specific process in which the connecting module 22 connects the obtained second VNF instance to the NS and the configuring module 23 configures the forwarding paths of the service flows in the NS. Specifically:

After the instantiating module 21 obtains the second VNF instance, the second VNF instance is connected to the second NS, and an updated second NS is obtained, where the updated second NS includes the first VNFFG and a second VNFFG, the second VNFFG includes the second VNF instance, and a manner in which the second VNF instance in the second VNFFG is connected to other VNF instances in the second VNFFG is the same as a manner in which the first VNF instance in the first VNFFG is connected to other VNF instances in the first VNFFG That is, a second VNFFG is added to the second NS, and the second NS is updated. For example, as shown in FIG. 3, the updated second NS includes two VNFFGs, which are the first VNFFG and the second VNFFG (the first VNFFG is the original VNFFG in the second NS, and the second VNFFG is the added VNFFG including the second VNF instance). The first VNFFG includes five instances: VNF1, VNF2, VNF3, VNFx, and VNF4, where VNFx represents the first VNF instance. The second VNFFG includes five VNF instances: VNF1, VNF2, VNF3, VNFy, and VNF4, where VNFy represents the second VNF instance. Referring to FIG. 3, in the first VNFFG the VNFx, VNF1, VNF2, VNF3, and VNF4 are connected in a cascading manner. Therefore, in the second VNFFG the VNFy, VNF1, VNF2, VNF3, and VNF4 are also connected in a cascading manner. For another example, referring to FIG. 4, the updated second NS includes two VNFFGs, which are the first VNFFG and the second VNFFG (the first VNFFG is the original VNFFG in the second NS, and the second VNFFG is the added VNFFG including the second VNF instance). The first VNFFG includes five VNF instances: VNFx1, VNF2x, VNF3x, VNF4x, and VNF5x, where all the VNFx1, VNF2x, VNF3x, VNF4x, and VNF5x represent first VNF instances. The second VNFFG includes five VNF instances: VNF1y, VNF2y, VNF3y, VNF4y, and VNF5y, where all the VNF1y, VNF2y, VNF3y, VNF4y, and VNF5y represent second VNF instances. That is, in the example in FIG. 4, software versions of all the VNFs included in the second NS are upgraded, and VNF instances of new software versions are obtained. In the first VNFFG, the VNFx1, VNF2x, VNF3x, VNF4x, and VNF5x are connected in a cascading manner. Therefore, in the second VNFFG, the VNF1y, VNF2y, VNF3y, VNF4y, and VNF5y are also connected in a cascading manner.

Still further, the configuring module 23 may configure the forwarding paths of the service flows in the NS in two implementation manners, which are respectively as follows:

First manner: The configuring module 23 configures the first VNFFG and the second VNFFG for the service flows as the forwarding paths of the service flows, so that the first service flow is forwarded to the first VNFFG for processing, and that the second service flow is forwarded to the second VNFFG for processing.

Second manner: The configuring module 23 instructs an NS service management entity to configure the first VNFFG and the second VNFFG for the service flows as the forwarding paths of the service flows, so that the first service flow is forwarded to the first VNFFG for processing, and that the second service flow is forwarded to the second VNFFG for processing.

Regardless of the first manner or the second manner, the forwarding paths may be implemented in multiple manners. For example, policy-based routing is used, which requires that service flows should be forwarded according to source addresses, so that a service flow coming from a new source address is forwarded to a new VNFFG; or a tunneling technology is used, and forwarding paths of new and old data flows are distinguished by using tunnel configurations; or an SFC mechanism defined by the IETF or other service chaining (service chain) mechanisms are used.

In addition, it should be noted that in the foregoing embodiment, after the configuring module 23 configures the forwarding paths of the service flows in the NS, so that the first service flow is forwarded to the first VNF instance and that the second service flow is forwarded to the second VNF instance, the determining and terminating module 24 determines whether the first VNF instance runs without loads within a preset time, and if yes, terminates the first VNF instance in time. Optionally, the determining and terminating module 24 may further acquire a running status of the first VNF instance monitored by the NS service management entity, that is, the running status of the VNF instance is monitored by the NS service management entity, and the NS service management entity notifies the monitored running status of the first VNF instance to the determining and terminating module 24; and if the first VNF instance runs without loads within the preset time, the determining and terminating module 24 instructs the NS management entity to terminate the first VNF instance. Alternatively, the determining and terminating module 24 may instruct the NS service management entity to monitor a running status of the first VNF instance and instruct the NS service management entity to terminate the first VNF instance when it is detected that the first VNF instance runs without loads within the preset time. That is, the determining and terminating module 24 gives one instruction to the NS service management entity: as long as the NS service management entity detects that the first VNF instance runs without loads within the preset time, the NS service management entity directly terminates the first VNF instance but does not need to send the monitored running status of the first VNF instance to the determining and terminating module 24.

On a basis of the foregoing Embodiment 4, this embodiment relates to another specific process in which the connecting module 22 connects the obtained second VNF instance to the NS and the configuring module 23 configures the forwarding paths of the service flows in the NS. Specifically:

The connecting module 22 connects the second VNF instance obtained by the instantiating module 21 to the NS in which the first VNF instance is located, where a manner in which the second VNF instance is connected to other VNF instances in the NS is the same as a manner in which the first VNF instance is connected to other VNF instances in the NS. Herein actually the second VNF instance is connected to the NS as an extension of the first VNF instance. For a specific connection manner, refer to FIG. 3. Afterward, the configuring module 23 may configure the forwarding paths of the service flows in the NS in four implementation manners, which are respectively as follows:

First manner: The configuring module 23 configures the first VNF instance and the second VNF instance for the service flows as nodes of the forwarding paths of the service flows in the NS, and generates a service flow forwarding table; afterward, the configuring module 23 configures the service flow forwarding table for a third VNF instance, so that the third VNF instance forwards, according to the service flow forwarding table, the first service flow to the first VNF instance for processing and the second service flow to the second VNF instance for processing, where the third VNF instance is adjacent to the first VNF instance and the second VNF instance separately.

Second manner: The configuring module 23 instructs an NS service management entity to configure the first VNF instance and the second VNF instance for the service flows as nodes of the forwarding paths of the service flows in the NS and generate a service flow forwarding table; afterward, the configuring module 23 configures the service flow forwarding table for a third VNF instance, so that the third VNF instance forwards, according to the service flow forwarding table, the first service flow to the first VNF instance for processing and the second service flow to the second VNF instance for processing, where the third VNF instance is adjacent to the first VNF instance and the second VNF instance separately.

Third manner: The configuring module 23 configures a weight of a first virtual link between the first VNF instance and a third VNF instance and a weight of a second virtual link between the second VNF instance and the third VNF instance for the third VNF instance, so that the third VNF instance forwards, according to the weight of the first virtual link and the weight of the second virtual link, the first service flow to the first VNF instance for processing and the second service flow to the second VNF instance for processing, where the third VNF instance is adjacent to the first VNF instance and the second VNF instance separately.

Fourth manner: The configuring module 23 instructs an NS service management entity to configure a weight of a first virtual link between the first VNF instance and a third VNF instance and a weight of a second virtual link between the second VNF instance and the third VNF instance for the third VNF instance, so that the third VNF instance forwards, according to the weight of the first virtual link and the weight of the second virtual link, the first service flow to the first VNF instance for processing and the second service flow to the second VNF instance for processing, where the third VNF instance is adjacent to the first VNF instance and the second VNF instance separately.

For the first and second implementation manners, the service flow forwarding table may be a mapping relationship table of different service flows and forwarding nodes, that is, the third VNF instance knows, according to the mapping relationship table of service flows and forwarding nodes, that different service flows are forwarded to corresponding nodes for processing.

For the third and fourth implementation manners, optionally, the configuring module 23 may configure a COST value of the virtual link between the second VNF instance and the third VNF instance, so that the COST value is far less than a COST value of the virtual link between the first VNF instance and the third VNF instance; if the NFVO or the NS service management entity does not know the COST value of the virtual link between the first VNF instance and the third VNF instance, an extremely COST value may be configured for the virtual link between the second VNF instance and the third VNF instance, to ensure that the COST value of that virtual link is less than the COST value of the virtual link between the first VNF instance and the third VNF instance. Therefore, the third VNF instance may select a link with a low COST value according to the configured forwarding paths. Old service flows are still processed by the first VNF instance and new service flows are forwarded to the second VNF instance for processing.

In addition, it should be noted that in the foregoing embodiment, after the configuring module 23 configures the forwarding paths of the service flows in the NS, so that the first service flow is forwarded to the first VNF instance and that the second service flow is forwarded to the second VNF instance, the determining and terminating module 24 determines whether the first VNF instance runs without loads within a preset time, and if yes, terminates the first VNF instance in time. Optionally, the determining and terminating module 24 may further acquire a running status of the first VNF instance monitored by the NS service management entity, that is, the running status of the VNF instance is monitored by the NS service management entity, and the NS service management entity notifies the monitored running status of the first VNF instance to the determining and terminating module 24; and if the first VNF instance runs without loads within the preset time, the determining and terminating module 24 instructs the NS management entity to terminate the first VNF instance. Alternatively, the determining and terminating module 24 may instruct the NS service management entity to monitor a running status of the first VNF instance and instruct the NS service management entity to terminate the first VNF instance when it is detected that the first VNF instance runs without loads within the preset time. That is, the determining and terminating module 24 gives one instruction to the NS service management entity: as long as the NS service management entity detects that the first VNF instance runs without loads within the preset time, the NS service management entity directly terminates the first VNF instance but does not need to send the monitored running status of the first VNF instance to the determining and terminating module 24.

In the network function virtualization orchestrator provided by the embodiment of the present application, a receiving module receives an upgrade request message sent by a sender, where the upgrade request message is configured to request to upgrade a first software version of a first VNF to a second software version; an instantiating module instantiates the first VNF according to a preset VNFD of the second software version in a VNF catalog to obtain a second VNF instance, and a connecting module connects the second VNF instance to an NS in which a first VNF instance is located; afterward, a configuring module configures forwarding paths of service flows in the NS, so that a first service flow is forwarded to the first VNF instance for processing and that a second service flow is forwarded to the second VNF instance for processing, so that the first VNF instance and the second VNF instance may process different service flows concurrently; and a determining and terminating module terminates the first VNF instance when it is determined that the first VNF instance runs without loads within a preset time. In this way, seamless switching between the first VNF instance and the second VNF instance is implemented, interruption of running of a VNF instance of an old version in a VNF upgrade process is avoided, and real-time requirements of service flows are met.

Figure 8:
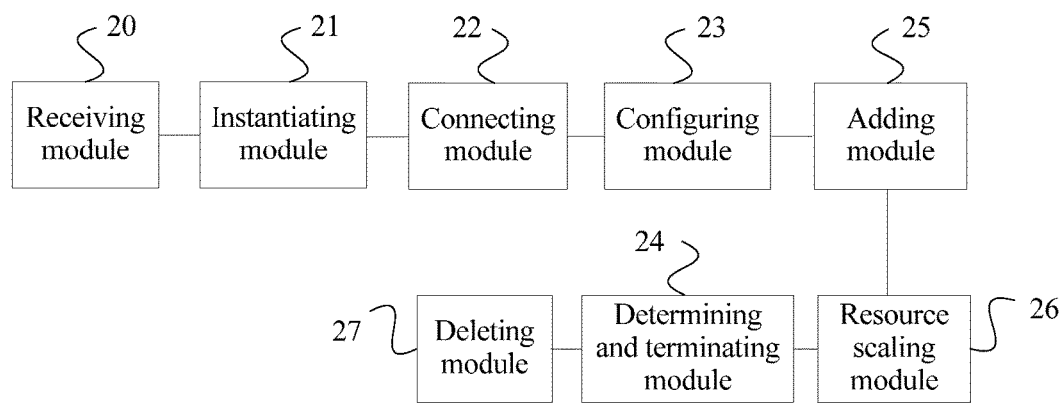
FIG. 8 is a schematic structural diagram of Embodiment 5 of a network function virtualization orchestrator according to the present application.

FIG. 8 is a schematic structural diagram of Embodiment 5 of a network function virtualization orchestrator according to the present application. On a basis of the foregoing embodiment, the network function virtualization orchestrator may further include: an adding module 25, configured to add the second VNF instance to an NFV instance repository after the configuring module 23 configures the forwarding paths of the service flows in the NS; a resource scaling module 26, configured to start a VNF resource scaling process to perform resource scaling processing on the first VNF instance and the second VNF instance; and a deleting module 27, configured to delete the first VNF instance from the NFV instance repository after the determining and terminating module 24 terminates the first VNF instance.

It should be noted that all the adding module 25, the resource scaling module 26, and the deleting module 27 may be located in the embodiment shown in FIG. 5, or may be located in the embodiment shown in FIG. 6, or may be located in the embodiment shown in FIG. 7. FIG. 8 is described only by using an example in which the adding module 25, the resource scaling module 26, and the deleting module 27 are located in the embodiment shown in FIG. 5.

Specifically, the adding module 25 adds the second VNF instance to the NFV instance repository after the configuring module 23 configures the forwarding paths of the service flows in the NS, so that the first service flow is forwarded to the first VNF instance and that the second service flow is forwarded to the second VNF instance. In this case, the second VNF instance and the first VNF instance work simultaneously, but loads of the second VNF instance increase and loads of the first VNF instance decrease gradually. To ensure efficient use of resources, the resource scaling module 26 may start the resource scaling process, reduce resources used by the first VNF instance, and increase resources used by the second VNF instance, to ensure efficient rational use of resources.

Further, the deleting module 27 deletes an entry of the first VNF instance from the NFV instance repository after the determining and terminating module 24 terminates the first VNF instance to ensure accuracy of content of the NFV instance repository.

In the network function virtualization orchestrator provided by the embodiment of the present application, a receiving module receives an upgrade request message sent by a sender, where the upgrade request message is configured to request to upgrade a first software version of a first VNF to a second software version; an instantiating module instantiates the first VNF according to a preset VNFD of the second software version in a VNF catalog to obtain a second VNF instance, and a connecting module connects the second VNF instance to an NS in which a first VNF instance is located; afterward, a configuring module configures forwarding paths of service flows in the NS, so that a first service flow is forwarded to the first VNF instance for processing and that a second service flow is forwarded to the second VNF instance for processing, so that the first VNF instance and the second VNF instance may process different service flows concurrently; and a determining and terminating module terminates the first VNF instance when it is determined that the first VNF instance runs without loads within a preset time. In this way, seamless switching between the first VNF instance and the second VNF instance is implemented, interruption of running of a VNF instance of an old version in a VNF upgrade process is avoided, and real-time requirements of service flows are met; and rational use of resources is ensured by starting a resource scaling module 26 to perform resource scaling processing on the first VNF instance and the second VNF instance.

Figure 9:
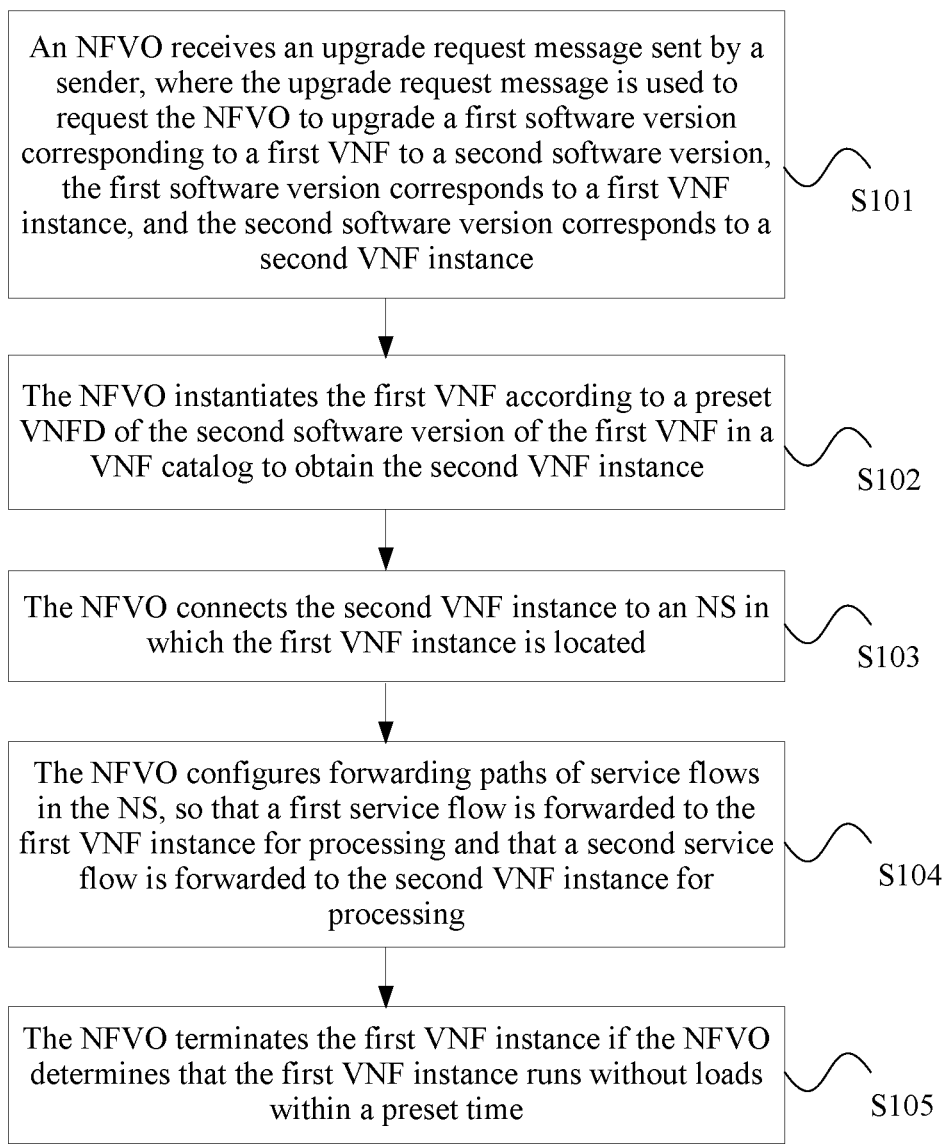
FIG. 9 is a flowchart of Embodiment 1 of a method for upgrading a virtualized network function according to the present application.

FIG. 9 is a flowchart of Embodiment 1 of a method for upgrading a virtualized network function according to the present application. The method may be executed by the NFVO in the foregoing embodiment. As shown in FIG. 9, the method includes:

S101. An NFVO receives an upgrade request message sent by a sender, where the upgrade request message is configured to request the NFVO to upgrade a first software version corresponding to a first VNF to a second software version, the first software version corresponds to a first VNF instance, and the second software version corresponds to a second VNF instance.

S102. The NFVO instantiates the first VNF according to a preset VNFD of the second software version of the first VNF in a VNF catalog to obtain the second VNF instance.

S103. The NFVO connects the second VNF instance to an NS in which the first VNF instance is located.

S104. The NFVO configures forwarding paths of service flows in the NS, so that a first service flow is forwarded to the first VNF instance for processing and that a second service flow is forwarded to the second VNF instance for processing.

S105. The NFVO terminates the first VNF instance if the NFVO determines that the first VNF instance runs without loads within a preset time.

For the method for upgrading a virtualized network function that is involved in the embodiment of the present application, refer to the specific execution process of the network function virtualization orchestrator in the foregoing embodiment. Implementation principles and technical effects of the method and the network function virtualization orchestrator are similar, and are not further described herein.

Figure 10:
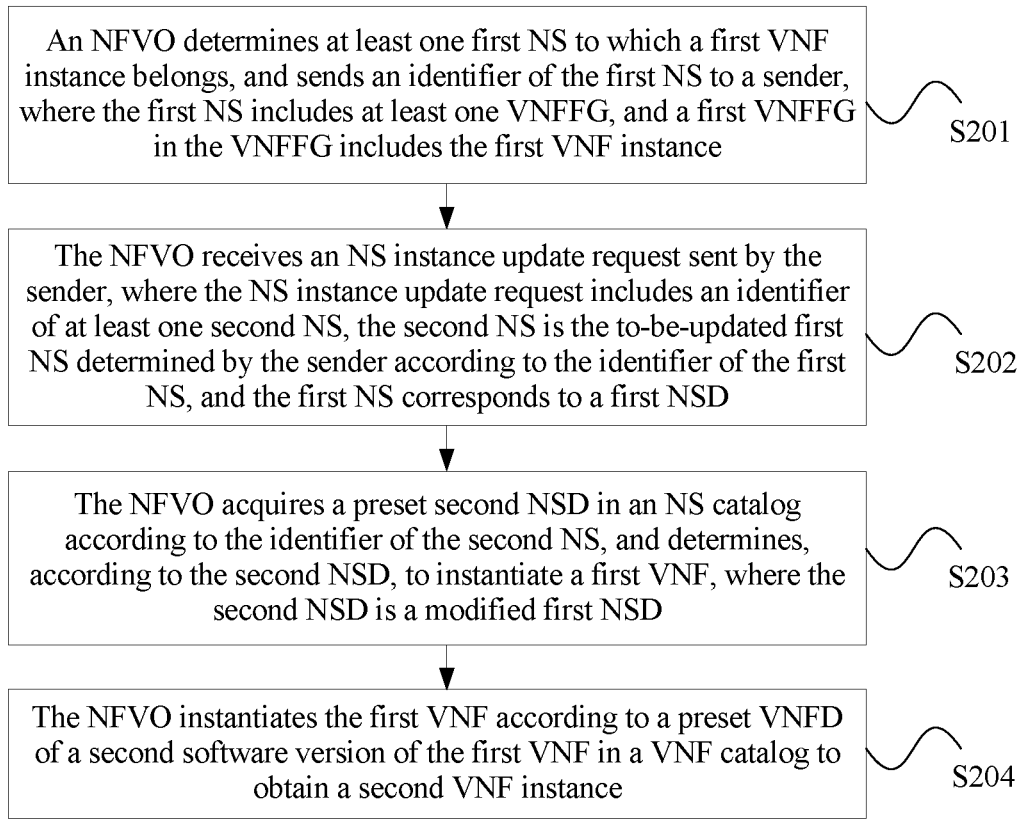
FIG. 10 is a flowchart of Embodiment 2 of a method for upgrading a virtualized network function according to the present application.

FIG. 10 is a flowchart of Embodiment 2 of a method for upgrading a virtualized network function according to the present application. The method may be executed by the NFVO in the foregoing embodiment. This embodiment relates to a feasible implementation manner in which the NFVO obtains the second VNF instance. The foregoing step S102 specifically includes:

S201. The NFVO determines at least one first NS to which the first VNF instance belongs, and sends an identifier of the first NS to the sender, where the first NS includes at least one VNFFG and a first VNFFG in the VNFFG includes the first VNF instance.

S202. The NFVO receives an NS instance update request sent by the sender, where the NS instance update request includes an identifier of at least one second NS, the second NS is the to-be-updated first NS determined by the sender according to the identifier of the first NS, and the first NS corresponds to a first NSD.

S203. The NFVO acquires a preset second NSD in an NS catalog according to the identifier of the second NS, and determines, according to the second NSD, to instantiate the first VNF, where the second NSD is a modified first NSD.

S204. The NFVO instantiates the first VNF according to the preset VNFD of the second software version of the first VNF in the VNF catalog to obtain the second VNF instance.

For the method for upgrading a virtualized network function that is involved in the embodiment of the present application, refer to the specific execution process of the network function virtualization orchestrator in the foregoing embodiment. Implementation principles and technical effects of the method and the network function virtualization orchestrator are similar, and are not further described herein.

Further, the foregoing step S103 may be specifically: the NFVO connects the second VNF instance to the second NS, and obtains an updated second NS, where the updated second NS includes the first VNFFG and a second VNFFG, the second VNFFG includes the second VNF instance, and a manner in which the second VNF instance in the second VNFFG is connected to other VNF instances in the second VNFFG is the same as a manner in which the first VNF instance in the first VNFFG is connected to other VNF instances in the first VNFFG.

Further, the foregoing step S104 may be specifically implemented in two manners, specifically:

First manner: The NFVO configures the first VNFFG and the second VNFFG for the service flows as the forwarding paths of the service flows, so that the first service flow is forwarded to the first VNFFG for processing, and that the second service flow is forwarded to the second VNFFG for processing.

Second manner: The NFVO instructs an NS service management entity to configure the first VNFFG and the second VNFFG for the service flows as the forwarding paths of the service flows, so that the first service flow is forwarded to the first VNFFG for processing, and that the second service flow is forwarded to the second VNFFG for processing.

In addition, the foregoing step S105 may be specifically: the NFVO acquires a running status of the first VNF instance monitored by the NS service management entity; and if the first VNF instance runs without loads within the preset time, the NFVO instructs the NS management entity to terminate the first VNF instance. Optionally, step S105 may further be: the NFVO instructs the NS service management entity to monitor a running status of the first VNF instance, and when the first VNF instance runs without loads within the preset time, terminate the first VNF instance.

For the method for upgrading a virtualized network function that is involved in the embodiment of the present application, refer to the specific execution process of the network function virtualization orchestrator in the foregoing embodiment. Implementation principles and technical effects of the method and the network function virtualization orchestrator are similar, and are not further described herein.

Figure 11:
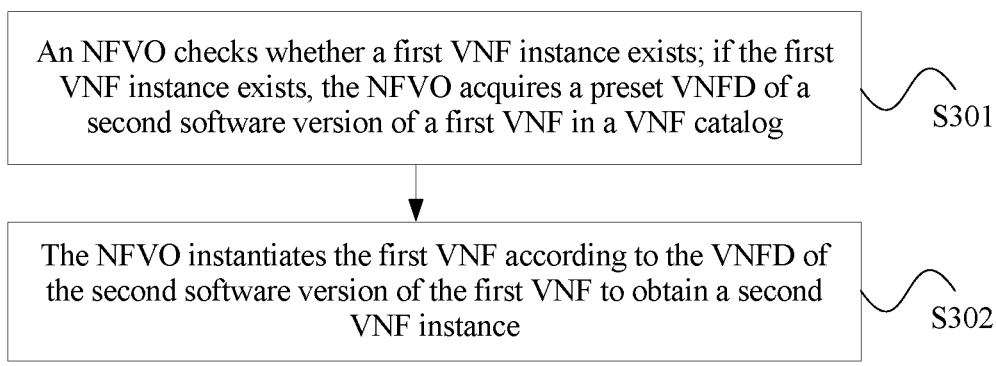
FIG. 11 is a flowchart of Embodiment 3 of a method for upgrading a virtualized network function according to the present application.

FIG. 11 is a flowchart of Embodiment 3 of a method for upgrading a virtualized network function according to the present application. The method may be executed by the NFVO in the foregoing embodiment. This embodiment relates to another feasible implementation manner in which the NFVO obtains the second VNF instance. That is, the foregoing step S102 may specifically further include:

S301. The NFVO checks whether the first VNF instance exists; if the first VNF instance exists, the NFVO acquires the preset VNFD of the second software version of the first VNF in the VNF catalog.

S302. The NFVO instantiates the first VNF according to the VNFD of the second software version of the first VNF to obtain the second VNF instance.

For the method for upgrading a virtualized network function that is involved in the embodiment of the present application, refer to the specific execution process of the network function virtualization orchestrator in the foregoing embodiment. Implementation principles and technical effects of the method and the network function virtualization orchestrator are similar, and are not further described herein.

Further, the foregoing step S103 may be specifically: the NFVO connects the second VNF instance to the NS in which the first VNF instance is located, where a manner in which the second VNF instance is connected to other VNF instances in the NS is the same as a manner in which the first VNF instance is connected to other VNF instances in the NS.

Further, the foregoing step S104 may be specifically implemented in four manners, specifically:

First manner: The NFVO configures the first VNF instance and the second VNF instance for the service flows as nodes of the forwarding paths of the service flows in the NS, and generates a service flow forwarding table; and configures the service flow forwarding table for a third VNF instance, so that the third VNF instance forwards, according to the service flow forwarding table, the first service flow to the first VNF instance for processing and the second service flow to the second VNF instance for processing, where the third VNF instance is adjacent to the first VNF instance and the second VNF instance separately.

Second manner: The NFVO configures a weight of a first virtual link between the first VNF instance and a third VNF instance and a weight of a second virtual link between the second VNF instance and the third VNF instance for the third VNF instance, so that the third VNF instance forwards, according to the weight of the first virtual link and the weight of the second virtual link, the first service flow to the first VNF instance for processing and the second service flow to the second VNF instance for processing, where the third VNF instance is adjacent to the first VNF instance and the second VNF instance separately.

Third manner: The NFVO instructs an NS service management entity to configure the first VNF instance and the second VNF instance for the service flows as nodes of the forwarding paths of the service flows in the NS and generate a service flow forwarding table; and instructs the NS service management entity to configure the service flow forwarding table for a third VNF instance, so that the third VNF instance forwards, according to the service flow forwarding table, the first service flow to the first VNF instance for processing and the second service flow to the second VNF instance for processing, where the third VNF instance is adjacent to the first VNF instance and the second VNF instance separately.

Fourth manner: The NFVO instructs an NS service management entity to configure a weight of a first virtual link between the first VNF instance and a third VNF instance and a weight of a second virtual link between the second VNF instance and the third VNF instance for the third VNF instance, so that the third VNF instance forwards, according to the weight of the first virtual link and the weight of the second virtual link, the first service flow to the first VNF instance for processing and the second service flow to the second VNF instance for processing, where the third VNF instance is adjacent to the first VNF instance and the second VNF instance separately.

In addition, the foregoing step S105 may be specifically: the NFVO acquires a running status of the first VNF instance monitored by the NS service management entity; and if the first VNF instance runs without loads within the preset time, the NFVO instructs the NS management entity to terminate the first VNF instance. Optionally, step S105 may further be: the NFVO instructs the NS service management entity to monitor a running status of the first VNF instance, and when the first VNF instance runs without loads within the preset time, terminate the first VNF instance.

For the method for upgrading a virtualized network function that is involved in the embodiment of the present application, refer to the specific execution process of the network function virtualization orchestrator in the foregoing embodiment. Implementation principles and technical effects of the method and the network function virtualization orchestrator are similar, and are not further described herein.

Figure 12:
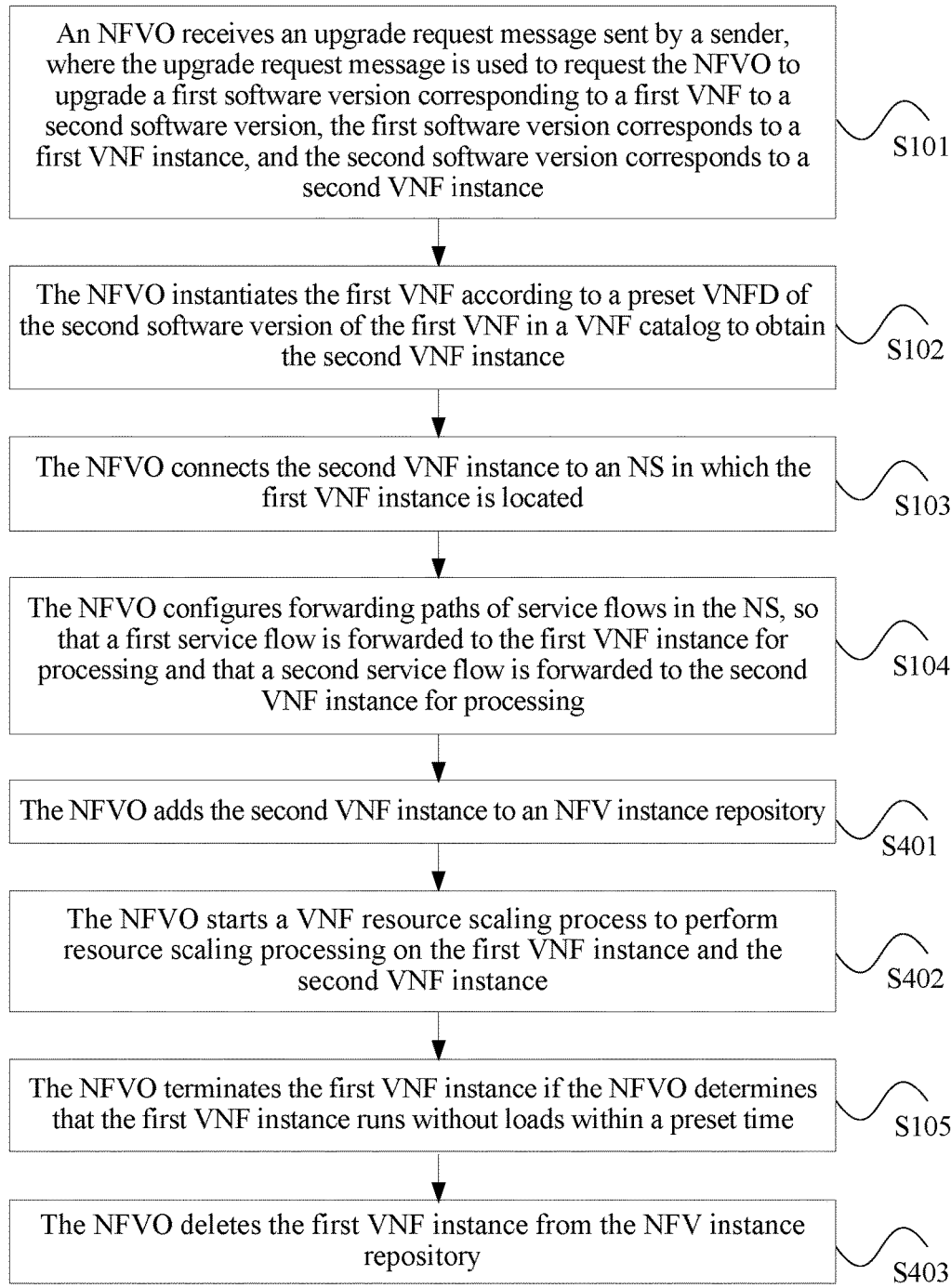
FIG. 12 is a flowchart of Embodiment 4 of a method for upgrading a virtualized network function according to the present application.

FIG. 12 is a flowchart of Embodiment 4 of a method for upgrading a virtualized network function according to the present application. This embodiment relates to a process in which the NFVO performs resource scaling processing on the first VNF instance and the second VNF instance. On a basis of the foregoing embodiment, further, after the foregoing step S104, the method further includes:

S401. The NFVO adds the second VNF instance to an NFV instance repository.

S402. The NFVO starts a VNF resource scaling process to perform resource scaling processing on the first VNF instance and the second VNF instance.

In addition, after the foregoing step S105, the method further includes:

S403. The NFVO deletes the first VNF instance from the NFV instance repository.

For the method for upgrading a virtualized network function that is involved in the embodiment of the present application, refer to the specific execution process of the network function virtualization orchestrator in the foregoing embodiment. Implementation principles and technical effects of the method and the network function virtualization orchestrator are similar, and are not further described herein.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A network function virtualization orchestrator, comprising:

a receiver, configured to receive an upgrade request message sent by a sender, wherein the upgrade request message is configured to request the network function virtualization orchestrator (NFVO) to upgrade a first software version corresponding to a first virtualized network function (VNF) to a second software version, the first software version corresponds to a first VNF instance, and the second software version corresponds to a second VNF instance; and a processor, configured to:

instantiate the first VNF according to a preset virtualized network function descriptor (VNFD) of the second software version of the first VNF in a VNF catalog to obtain the second VNF instance;

after connecting the second VNF instance to a network service (NS) in which the first VNF instance is located, configure forwarding paths of service flows in the NS, so that a first service flow is forwarded to the first VNF instance for processing and that a second service flow is forwarded to the second VNF instance for processing; and terminate, the first VNF instance if it is determined that the first VNF instance runs without loads within a preset time;

determine at least one first NS to which the first VNF instance belongs, and send an identifier of the first NS to the sender, wherein the first NS comprises at least one virtualized network function forwarding graph (VNFFG), a first VNFFG of the at least one VNFFG comprises the first VNF instance, and the first NS corresponds to a first network service descriptor (NSD);

acquire a preset second NSD in an NS catalog according to an identifier of a second NS in an NS instance update request that is sent by the sender and received by the receiver, and determine, according to the second NSD, to instantiate the first VNF, wherein the second NS is the to-be-updated first NS determined by the sender according to the identifier of the first NS, and the second NSD is a modified first NSD; and instantiate the first VNF according to the preset VNFD of the second software version of the first VNF in the VNF catalog to obtain the second VNF instance; and the receiver is further configured to receive the NS instance update request sent by the sender, wherein the NS instance update request comprises an identifier of at least one second NS.

2. The network function virtualization orchestrator according to claim 1, wherein the processor is specifically configured to connect the second VNF instance to the second NS, and obtain an updated second NS, wherein the updated second NS comprises the first VNFFG and a second VNFFG, the second VNFFG comprises the second VNF instance, and a manner in which the second VNF instance in the second VNFFG is connected to other VNF instances in the second VNFFG is the same as a manner in which the first VNF instance in the first VNFFG is connected to other VNF instances in the first VNFFG.

3. The network function virtualization orchestrator according to claim 2, wherein the processor is specifically configured to configure the first VNFFG and the second VNFFG for the service flows as the forwarding paths of the service flows, so that the first service flow is forwarded to the first VNFFG for processing, and that the second service flow is forwarded to the second VNFFG for processing.

4. The network function virtualization orchestrator according to claim 2, wherein the processor is specifically configured to instruct an NS service management entity to configure the first VNFFG and the second VNFFG for the service flows as the forwarding paths of the service flows, so that the first service flow is forwarded to the first VNFFG for processing, and that the second service flow is forwarded to the second VNFFG for processing.

5. The network function virtualization orchestrator according to claim 1, wherein the processor is specifically configured to check whether the first VNF instance exists; if the first VNF instance exists, acquire the preset VNFD of the second software version of the first VNF in the VNF catalog; and instantiate the first VNF according to the VNFD of the second software version of the first VNF to obtain the second VNF instance.

6. The network function virtualization orchestrator according to claim 5, wherein the processor is specifically configured to connect the second VNF instance to the NS in which the first VNF instance is located, wherein a manner in which the second VNF instance is connected to other VNF instances in the NS is the same as a manner in which the first VNF instance is connected to other VNF instances in the NS.

7. The network function virtualization orchestrator according to claim 6, wherein the processor is specifically configured to configure the first VNF instance and the second VNF instance for the service flows as nodes of the forwarding paths of the service flows in the NS, and generate a service flow forwarding table; and configure the service flow forwarding table for a third VNF instance, so that the third VNF instance forwards, according to the service flow forwarding table, the first service flow to the first VNF instance for processing and the second service flow to the second VNF instance for processing, wherein the third VNF instance is adjacent to the first VNF instance and the second VNF instance separately.

8. The network function virtualization orchestrator according to claim 6, wherein the processor is specifically configured to configure a weight of a first virtual link between the first VNF instance and a third VNF instance and a weight of a second virtual link between the second VNF instance and the third VNF instance for the third VNF instance, so that the third VNF instance forwards, according to the weight of the first virtual link and the weight of the second virtual link, the first service flow to the first VNF instance for processing and the second service flow to the second VNF instance for processing, wherein the third VNF instance is adjacent to the first VNF instance and the second VNF instance separately.

9. The network function virtualization orchestrator according to claim 6, wherein the processor is specifically configured to instruct an NS service management entity to: configure the first VNF instance and the second VNF instance for the service flows as nodes of the forwarding paths of the service flows in the NS and generate a service flow forwarding table; and instruct the NS service management entity to configure the service flow forwarding table for a third VNF instance, so that the third VNF instance forwards, according to the service flow forwarding table, the first service flow to the first VNF instance for processing and the second service flow to the second VNF instance for processing, wherein the third VNF instance is adjacent to the first VNF instance and the second VNF instance separately.

10. A method for upgrading a virtualized network function, comprising:

receiving, by a network function virtualization orchestrator (NFVO), an upgrade request message sent by a sender, wherein the upgrade request message is configured to request the NFVO to upgrade a first software version corresponding to a first virtualized network function (VNF) to a second software version, the first software version corresponds to a first VNF instance, and the second software version corresponds to a second VNF instance;

instantiating, by the NFVO, the first VNF according to a preset virtualized network function descriptor (VNFD) of the second software version of the first VNF in a VNF catalog to obtain the second VNF instance;

connecting, by the NFVO, the second VNF instance to a network service NS in which the first VNF instance is located;

configuring, by the NFVO, forwarding paths of service flows in the NS, so that a first service flow is forwarded to the first VNF instance for processing and that a second service flow is forwarded to the second VNF instance for processing; and terminating, by the NFVO, the first VNF instance if the NFVO determines that the first VNF instance runs without loads within a preset time, wherein the instantiating, by the NFVO, the first VNF according to a preset VNFD of the second software version of the first VNF in a VNF catalog to obtain the second VNF instance, comprises;

determining, by the NFVO, at least one first NS to which the first VNF instance belongs, and sending an identifier of the first NS to the sender, wherein the first NS comprises at least one virtualized network function forwarding graph (VNFFG), and a first VNFFG of the at least one VNFFG comprises the first VNF instance;

receiving, by the NFVO, an NS instance update request sent by the sender, wherein the NS instance update request comprises an identifier of at least one second NS, the second NS is the to-be-updated first NS determined by the sender according to the identifier of the first NS, and the first NS corresponds to a first network service descriptor (NSD);

acquiring, by the NFVO, a preset second NSD in an NS catalog according to the identifier of the second NS, and determining, according to the second NSD, to instantiate the first VNF, wherein the second NSD is a modified first NSD; and instantiating, by the NFVO, the first VNF according to the preset VNFD of the second software version of the first VNF in the VNF catalog to obtain the second VNF instance.

11. The method according to claim 10, wherein the connecting, by the NFVO, the second VNF instance to a network service NS in which the first VNF instance is located, comprises:

connecting, by the NFVO, the second VNF instance to the second NS, and obtaining an updated second NS, wherein the updated second NS comprises the first VNFFG and a second VNFFG, the second VNFFG comprises the second VNF instance, and a manner in which the second VNF instance in the second VNFFG is connected to other VNF instances in the second VNFFG is the same as a manner in which the first VNF instance in the first VNFFG is connected to other VNF instances in the first VNFFG.

12. The method according to claim 11, wherein the configuring, by the NFVO, forwarding paths of service flows in the NS, comprises:

configuring, by the NFVO, the first VNFFG and the second VNFFG for the service flows as the forwarding paths of the service flows, so that the first service flow is forwarded to the first VNFFG for processing, and that the second service flow is forwarded to the second VNFFG for processing.

13. The method according to claim 11, wherein the configuring, by the NFVO, forwarding paths of service flows in the NS, comprises:

instructing, by the NFVO, an NS service management entity to configure the first VNFFG and the second VNFFG for the service flows as the forwarding paths of the service flows, so that the first service flow is forwarded to the first VNFFG for processing, and that the second service flow is forwarded to the second VNFFG for processing.

14. The method according to claim 10, wherein the instantiating, by the NFVO, the first VNF according to a preset VNFD of the second software version of the first VNF in a VNF catalog to obtain the second VNF instance, comprises:

checking, by the NFVO, whether the first VNF instance exists;

if the first VNF instance exists, acquiring, by the NFVO, the preset VNFD of the second software version of the first VNF in the VNF catalog; and instantiating, by the NFVO, the first VNF according to the VNFD of the second software version of the first VNF to obtain the second VNF instance.

15. The method according to claim 14, wherein the connecting, by the NFVO, the second VNF instance to a network service NS in which the first VNF instance is located, comprises:

connecting, by the NFVO, the second VNF instance to the NS in which the first VNF instance is located, wherein a manner in which the second VNF instance is connected to other VNF instances in the NS is the same as a manner in which the first VNF instance is connected to other VNF instances in the NS.

16. The method according to claim 15, wherein the configuring, by the NFVO, forwarding paths of service flows in the NS, comprises:

configuring, by the NFVO, the first VNF instance and the second VNF instance for the service flows as nodes of the forwarding paths of the service flows in the NS, and generating a service flow forwarding table; and configuring, by the NFVO, the service flow forwarding table for a third VNF instance, so that the third VNF instance forwards, according to the service flow forwarding table, the first service flow to the first VNF instance for processing and the second service flow to the second VNF instance for processing, wherein the third VNF instance is adjacent to the first VNF instance and the second VNF instance separately.

17. The method according to claim 15, wherein the configuring, by the NFVO, forwarding paths of service flows in the NS, comprises:

configuring, by the NFVO, a weight of a first virtual link between the first VNF instance and a third VNF instance and a weight of a second virtual link between the second VNF instance and the third VNF instance for the third VNF instance, so that the third VNF instance forwards, according to the weight of the first virtual link and the weight of the second virtual link, the first service flow to the first VNF instance for processing and the second service flow to the second VNF instance for processing, wherein the third VNF instance is adjacent to the first VNF instance and the second VNF instance separately.

18. The method according to claim 15, wherein the configuring, by the NFVO, forwarding paths of service flows in the NS, comprises:

instructing, by the NFVO, an NS service management entity to configure the first VNF instance and the second VNF instance for the service flows as nodes of the forwarding paths of the service flows in the NS and generate a service flow forwarding table; and instructing, by the NFVO, the NS service management entity to configure the service flow forwarding table for a third VNF instance, so that the third VNF instance forwards, according to the service flow forwarding table, the first service flow to the first VNF instance for processing and the second service flow to the second VNF instance for processing, wherein the third VNF instance is adjacent to the first VNF instance and the second VNF instance separately.

* * * * *

UNITED STATES PATENT AND TRADEMARK OFFICE
CERTIFICATE OF CORRECTION

PATENT NO. : 10,177,982 B2
APPLICATION NO. : 15/222270
DATED : January 8, 2019
INVENTOR(S) : Fang Yu et al.

Page 1 of 1

It is certified that error appears in the above-identified patent and that said Letters Patent is hereby corrected as shown below:

In the Claims

Column 36, Line 51, In Claim 10, delete "comprises;" and insert -- comprises: --, therefor.

Signed and Sealed this
First Day of October, 2019

Andrei Iancu
*Director of the United States Patent and Trademark Office*